United States Patent
Zhang et al.

(10) Patent No.: US 11,616,973 B2
(45) Date of Patent: Mar. 28, 2023

(54) CODING OF BLOCK VECTORS FOR INTRA BLOCK COPY-CODED BLOCKS

(71) Applicants: Beijing Bytedance Network Technology Co., Ltd., Beijing (CN); Bytedance Inc., Los Angeles, CA (US)

(72) Inventors: Li Zhang, San Diego, CA (US); Jizheng Xu, San Diego, CA (US); Kai Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/506,539

(22) Filed: Oct. 20, 2021

(65) Prior Publication Data

US 2022/0046272 A1    Feb. 10, 2022

Related U.S. Application Data

(63) Continuation of application No. PCT/CN2020/092032, filed on May 25, 2020.

(30) Foreign Application Priority Data

May 25, 2020 (WO) .............. PCT/CN2019088454

(51) Int. Cl.
*H04N 19/52* (2014.01)
*H04N 19/70* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
CPC .... H04N 19/52; H04N 19/105; H04N 19/139; H04N 19/159; H04N 19/176; H04N 19/70
See application file for complete search history.

(56) References Cited

U.S. PATENT DOCUMENTS 10,462,483 B1 * 10/2019 Xu ..................... H04N 19/523
2013/0230103 A1    9/2013 Lim et al.
(Continued)

FOREIGN PATENT DOCUMENTS

CN    105493505 A    4/2016
CN    106464904 A    2/2017
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Anner N Holder
(74) *Attorney, Agent, or Firm* — Perkins Coie LLP

(57) ABSTRACT

Methods, devices and systems for intra-block coding based decoding or encoding of video while using block vector signaling and/or merge candidates are disclosed. An example method for video processing includes performing a conversion between a video region of a video and a bitstream representation of the video, wherein the bitstream representation selectively includes motion vector difference (MVD) related syntax elements for an intra block copy (IBC) advanced motion vector prediction (AMVP) mode based on a maximum number of a first type of IBC candidates used during the conversion of the video region, wherein, when an IBC mode is applied, samples of the video
(Continued)

region are predicted from other samples in a video picture corresponding to the video region.

19 Claims, 30 Drawing Sheets

(51) Int. Cl.
*H04N 19/105* (2014.01)
*H04N 19/139* (2014.01)
*H04N 19/159* (2014.01)
*H04N 19/176* (2014.01)
(52) U.S. Cl.
CPC ......... *H04N 19/159* (2014.11); *H04N 19/176* (2014.11); *H04N 19/70* (2014.11)

(56) References Cited

U.S. PATENT DOCUMENTS

| | | | | |
|---|---|---|---|---|
| 2015/0139296 | A1* | 5/2015 | Yu | H04N 19/70 375/240.02 |
| 2015/0271515 | A1* | 9/2015 | Pang | H04N 19/70 375/240.16 |
| 2015/0373370 | A1* | 12/2015 | Rapaka | H04N 19/52 375/240.02 |
| 2016/0100189 | A1* | 4/2016 | Pang | H04N 19/593 375/240.13 |
| 2016/0241858 | A1 | 8/2016 | Li et al. | |
| 2017/0118484 | A1* | 4/2017 | Maeda | H04N 19/557 |
| 2017/0142418 | A1* | 5/2017 | Li | H04N 19/513 |
| 2017/0230685 | A1* | 8/2017 | Gisquet | H04N 19/11 |
| 2018/0131957 | A1 | 5/2018 | Nakamura et al. | |
| 2019/0230360 | A1* | 7/2019 | Koyama | H04N 19/521 |
| 2020/0021827 | A1* | 1/2020 | Wenger | H04N 19/44 |
| 2020/0336735 | A1* | 10/2020 | Chang | H04N 19/176 |
| 2021/0400279 | A1* | 12/2021 | Ko | H04N 19/186 |
| 2022/0014754 | A1* | 1/2022 | Liang | H04N 19/132 |

FOREIGN PATENT DOCUMENTS

| | | | |
|---|---|---|---|
| CN | 109644267 | A | 4/2019 |
| JP | 2018521539 | A | 8/2018 |
| JP | 2022516062 | A | 2/2022 |
| KR | 20180038371 | A | 4/2018 |
| WO | 2017067429 | A1 | 4/2017 |
| WO | 2018039596 | A1 | 3/2018 |
| WO | 2018066959 | A1 | 4/2018 |
| WO | 2020227204 | A1 | 11/2020 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ultimate motion vector expression (Test 4.5.4)." Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

Nam et al. "CE8-related: Signaling on Maximum Number of Candidates for IBC Merge Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0461, 2019.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.

Sethuraman et al. "CE9: Results of DMVR related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0147, 2019.

Xu et al. "CE8-related: Combination test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0843, 2019.

JEM-7.0: https://jvet.hhi.fraunhofer.de/svn/svn_HMJEMSoftware/tags/HM-16.6-JEM-7.0.

vcgit.hhi.fraunhofer.de/jvet/VVCSoftware_VTM/tags/VTM-5.0.

International Search Report and Written Opinion from International Patent Application No. PCT/CN2020/092032 dated Aug. 19, 2020 (10 pages).

International Search Report and Written Opinion from International Patent Application No. PCT/CN2020/092033 dated Aug. 26, 2020 (10 pages).

Liu et al. "Overview of HEVC Extensions on Screen Content Coding," APSIPA Transactions on Signal and Information Processing, Jan. 2015, 4:1-12.

Xu et al. "Intra Block Copy in HEVC Screen Content Coding Extensions," IEEE Journal on Emerging and Selected Topics in Circuits and Systems, Dec. 2016, 6(4):409-419.

Extended European Search Report from European Patent Application No. 20815297.5 dated May 11, 2022 (11 pages).

Chen et al. "Algorithm Description for Versatile Video Coding and Test Model 4(VTM 4)," Joint Video Exploration Team (JVET) of ITU-T SG 16 WP 3 and ISO/IEC JTC 1/SC 29/WG 11, 13th Meeting: Marrakech, MA, Jan. 9-18, 2019 document JVET-M1002, 2019.

Li et al. "Improvement on Top of Tencent's CfP Response," Joint Video Experts Team (JVET) of ITU-T SG 16 WP 3 and ISO/IEC JTC 1/SC 29/WG 11 10th Meeting, San Dieog, US, Apr. 10-20, 2018, document JVET-J0047, 2018.

* cited by examiner

CODING OF BLOCK VECTORS FOR INTRA BLOCK COPY-CODED BLOCKS

CROSS-REFERENCE TO RELATED APPLICATION

This application is a continuation of International Patent Application No. PCT/CN2020/092032, filed on May 25, 2020, which claims the priority to and benefits of International Patent Application No. PCT/CN2019/088454 filed on May 25, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments in which intra-block coding based decoding or encoding of video is performed while using block vector signaling and/or merge candidates.

In one representative aspect, a method for video processing is disclosed. The method includes performing a conversion between a video region of a video and a bitstream representation of the video, wherein the bitstream representation selectively includes motion vector difference (MVD) related syntax elements for an intra block copy (IBC) advanced motion vector prediction (AMVP) mode based on a maximum number of a first type of IBC candidates used during the conversion of the video region, wherein, when an IBC mode is applied, samples of the video region are predicted from other samples in a video picture corresponding to the video region.

In another representative aspect, a method for video processing is disclosed. The method includes determining, for a conversion between a video region of a video and a bitstream representation of the video, that an indication of a use of an intra block copy (IBC) mode is disabled for the video region and the use of the IBC mode is enabled at a sequence level of the video, and performing, based on the determining, the conversion, wherein, when the IBC mode is applied, samples of the video region are predicted from other samples in a video picture corresponding to the video region.

In yet another representative aspect, a method for video processing is disclosed. The method includes performing a conversion between a video region of a video and a bitstream representation of the video, wherein the bitstream representation selectively includes an indication regarding a use of an intra block copy (IBC) mode and/or one or more IBC-related syntax element based on a maximum number of a first type of IBC candidates used during the conversion of the video region, wherein, when the IBC mode is applied, samples of the video region are predicted from other samples in a video picture corresponding to the video region.

In yet another representative aspect, a method for video processing is disclosed. The method includes performing a conversion between a video region of a video and a bitstream representation of the video, wherein an indication of a maximum number of a first type of intra block copy (IBC) candidates, used during the conversion of the video region, is signaled in the bitstream representation independently from a maximum number of merge candidates for an inter mode used during the conversion, wherein, when the IBC mode is applied, samples of the video region are predicted from other samples in a video picture corresponding to the video region.

In yet another representative aspect, a method for video processing is disclosed. The method includes performing a conversion between a video region of a video and a bitstream representation of the video, wherein a maximum number of intra block copy (IBC) motion candidates (denoted maxIBCCandNum), used during the conversion of the video region, is a function of a maximum number of IBC merge candidates (denoted maxIBCMrgNum) and a maximum number of IBC advanced motion vector prediction (AMVP) candidates (denoted maxIBCAMVPNum), wherein, when the IBC mode is applied, samples of the video region are predicted from other samples in a video picture corresponding to the video region.

In yet another representative aspect, a method for video processing is disclosed. The method includes performing a conversion between a video region of a video and a bitstream representation of the video, wherein a maximum number of intra block copy (IBC) motion candidates (denoted maxIBCCandNum), used during the conversion of the video region, is based on a coded mode information of the video region.

In yet another representative aspect, a method for video processing is disclosed. The method includes performing a conversion between a video region of a video and a bitstream representation of the video, wherein a decoded intra block copy (IBC) advanced motion vector prediction (AMVP) merge index or a decoded IBC merge index is smaller than a maximum number of intra block copy (IBC) motion candidates (denoted maxIBCCandNum).

In yet another representative aspect, a method for video processing is disclosed. The method includes determining, during a conversion between a video region of a video and a bitstream representation of the video, that an intra block copy (IBC) alternative motion vector predictor (AMVP) candidate index or an IBC merge candidate index fails to identify a block vector candidate in a block vector candidate list, and using, based on the determining, a default prediction block during the conversion.

In yet another representative aspect, a method for video processing is disclosed. The method includes determining, during a conversion between a video region of a video and a bitstream representation of the video, that an intra block copy (IBC) alternative motion vector predictor (AMVP) candidate index or an IBC merge candidate index fails to identify a block vector candidate in a block vector candidate list, and performing, based on the determining, the conversion by treating the video region as having an invalid block vector.

In yet another representative aspect, a method for video processing is disclosed. The method includes determining, during a conversion between a video region of a video and a bitstream representation of the video, that an intra block copy (IBC) alternative motion vector predictor (AMVP) candidate index or an IBC merge candidate index fails to satisfy a condition, generating, based on the determining, a supplemental block vector (BV) candidate list, and performing, using the supplemental BV candidate list, the conversion.

In yet another representative aspect, a method for video processing is disclosed. The method includes performing a conversion between a video region of a video and a bitstream representation of the video, wherein a maximum number of intra block copy (IBC) advanced motion vector prediction (AMVP) candidates (denoted maxIBCAMVP-Num) is unequal to two.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

Figure 1:
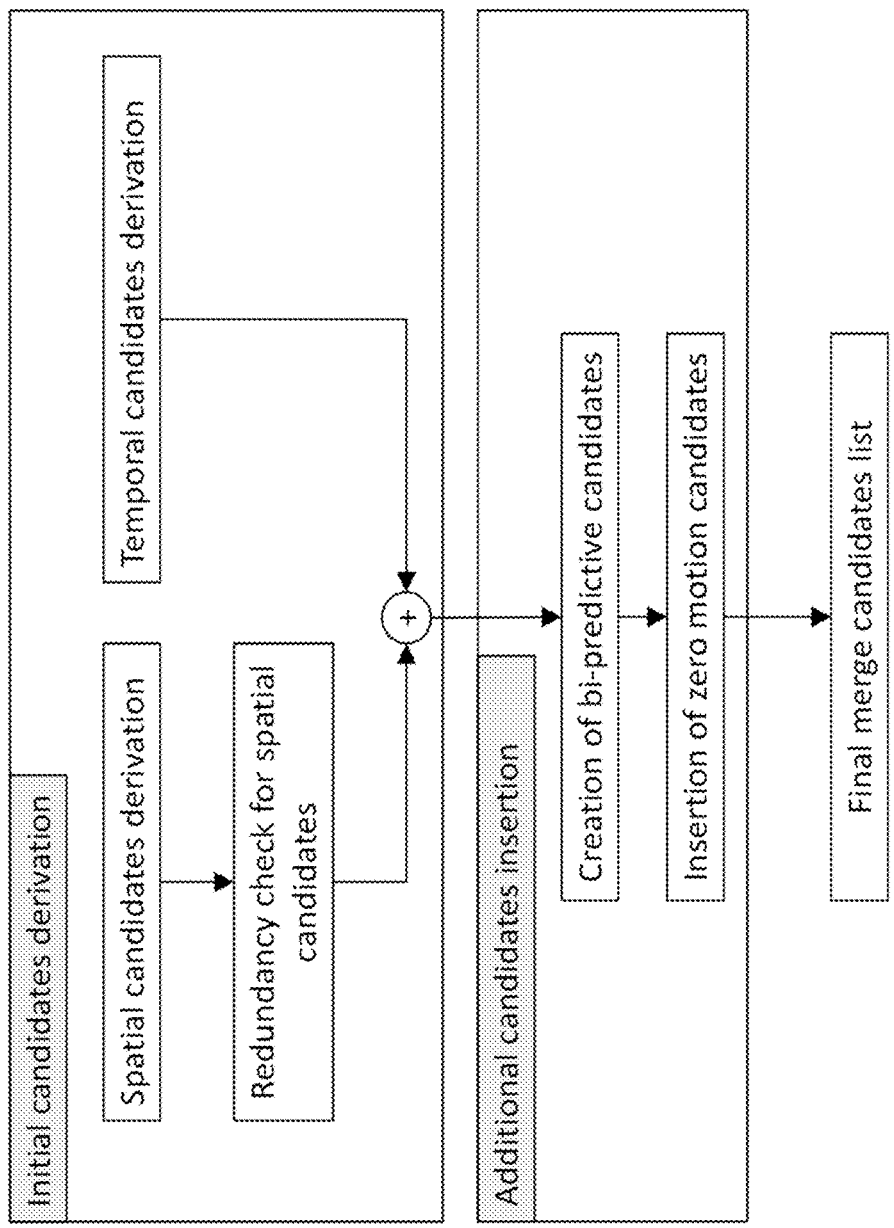
FIG. 1 shows an example of a derivation process for merge candidates list construction.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1 Summary

This invention is related to video coding technologies. Specifically, it is related to motion vector coding. It may be applied to the existing video coding standard like HEVC, or the standard (Versatile Video Coding) to be finalized. It may be also applicable to future video coding standards or video codec.

2 Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 5) could be found at:
    phenix.it-sudparis.eu/jvet/doc_end_user/documents/14_Geneva/wg11/JVET-N1001-v2.zip The latest reference software of VVC, named VTM, could be found at:
    vcgit.hhi.fraunhofer.de/jvet/VVCSoftware_VTM/tags/VTM-5.0

2.1 Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode

2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 shows an example of a derivation process for merge candidates list construction.

2.1.2.2 Spatial candidates derivation

Figure 3:
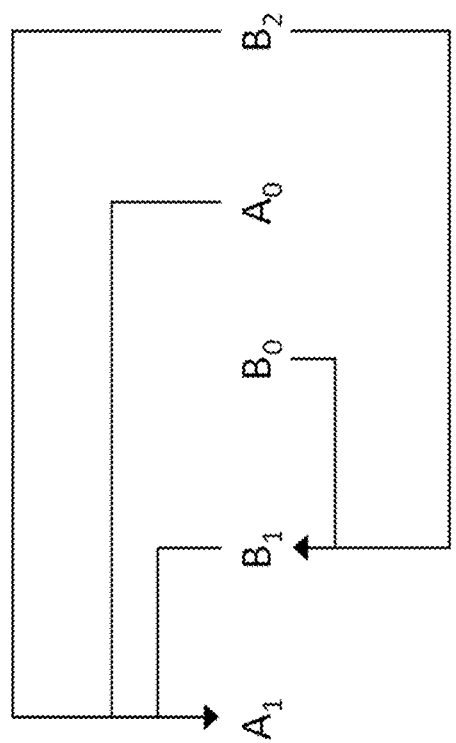
FIG. 3 shows examples of candidate pairs considered for redundancy check of spatial merge candidates.
Figure 2:
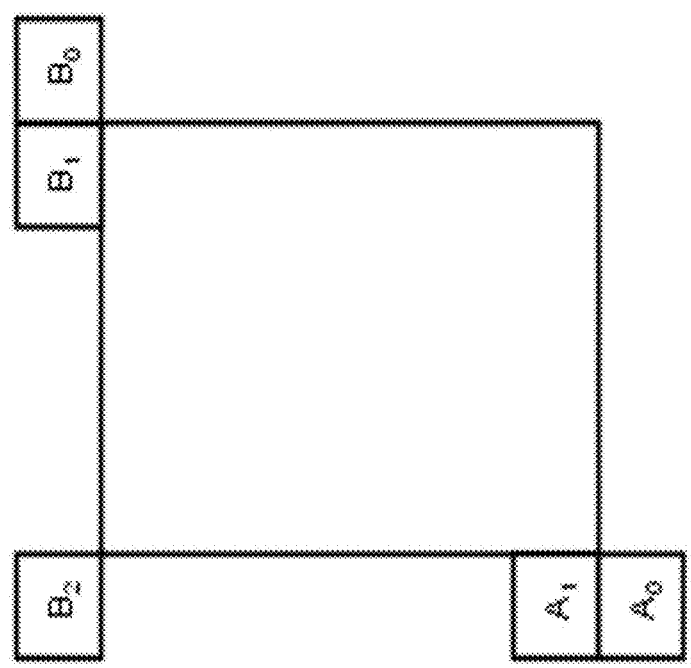
FIG. 2 shows example positions of spatial merge candidates.
Figure 4B:
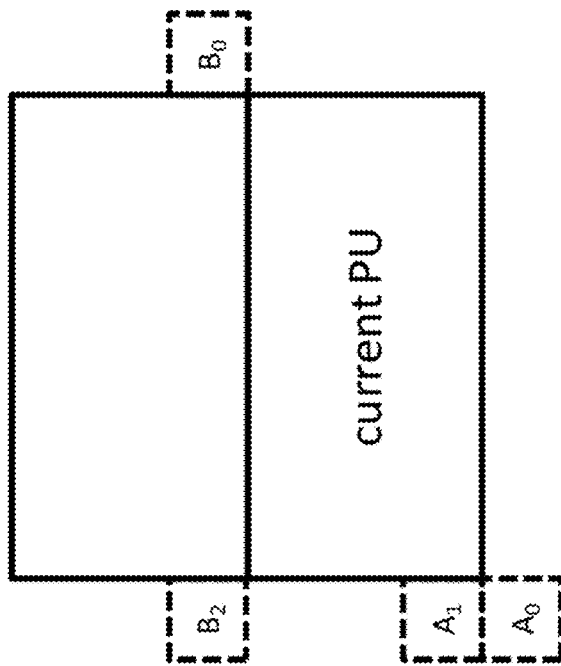
FIGS. 4A and 4B show examples of positions for a second prediction unit (PU) of N×2N and 2N×N partitions.
Figure 4A:
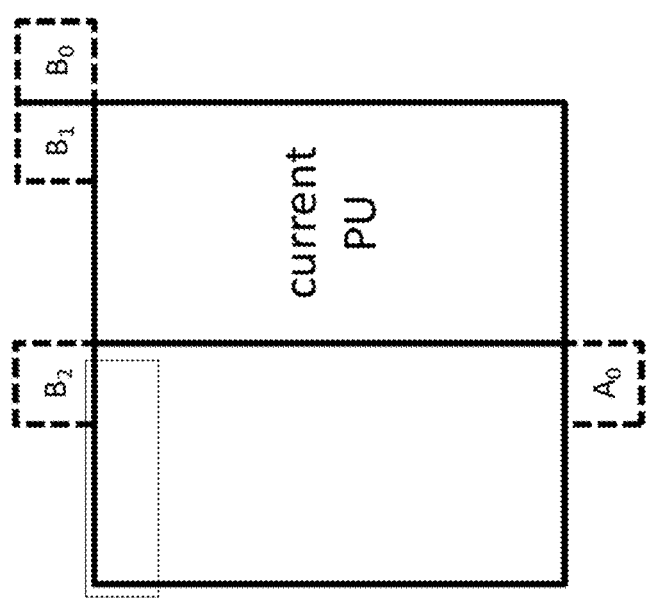

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 2 shows example positions of spatial merge candidates.

FIG. 3 shows examples of candidate pairs considered for redundancy check of spatial merge candidates.

FIG. 4 shows examples of positions for the second PU of N×2N and 2N×N partitions.

2.1.2.3 Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
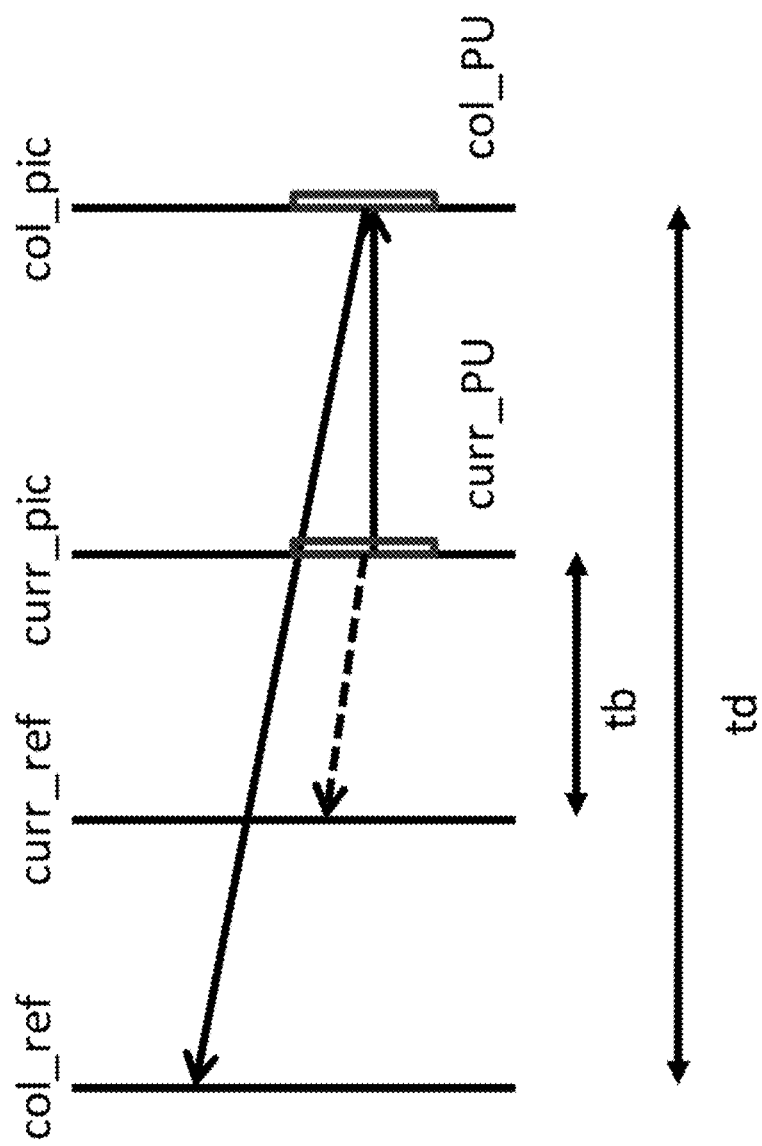
FIG. 5 is an illustration of motion vector scaling for temporal merge candidate.

FIG. 5 is an illustration of motion vector scaling for temporal merge candidate.

Figure 6:
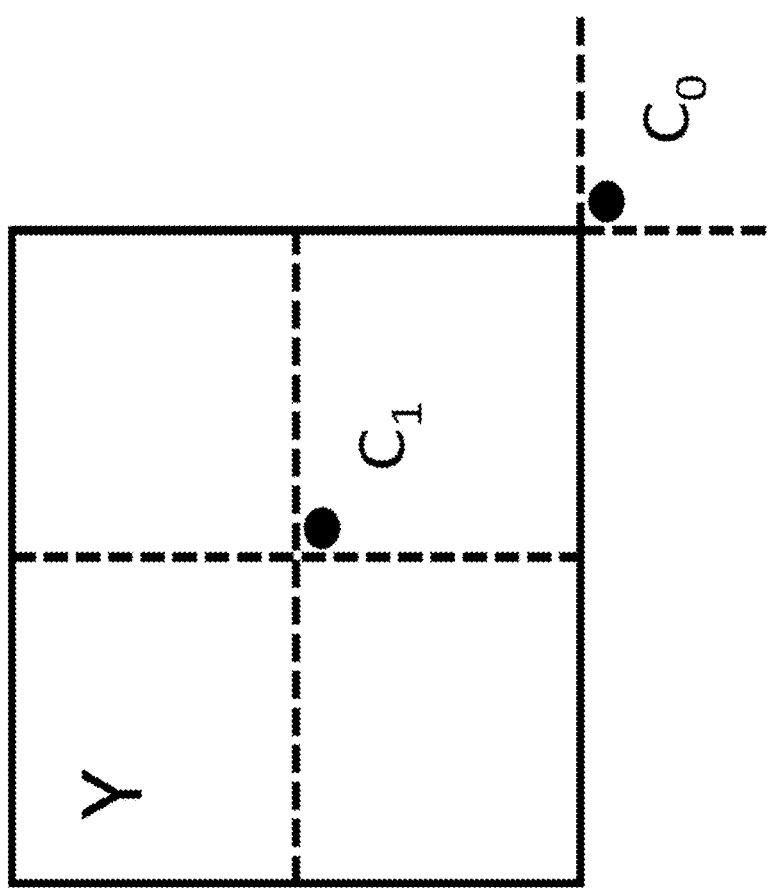
FIG. 6 shows example of candidate positions for temporal merge candidate, C0 and C1.

In the co-located PU (Y) belonging to the reference frame, the position for the temporal candidate is selected between candidates C0 and C1, as depicted in FIG. 6. If PU at position C0 is not available, is intra coded, or is outside of the current coding tree unit (CTU aka. LCU, largest coding unit) row, position C1 is used. Otherwise, position C0 is used in the derivation of the temporal merge candidate.

FIG. 6 shows example of candidate positions for temporal merge candidate, C0 and C1.

2.1.2.4 Additional Candidates Insertion

Besides spatial and temporal merge candidates, there are two additional types of merge candidates: combined bi-predictive merge candidate and zero merge candidate. Combined bi-predictive merge candidates are generated by utilizing spatial and temporal merge candidates.

Figure 7:
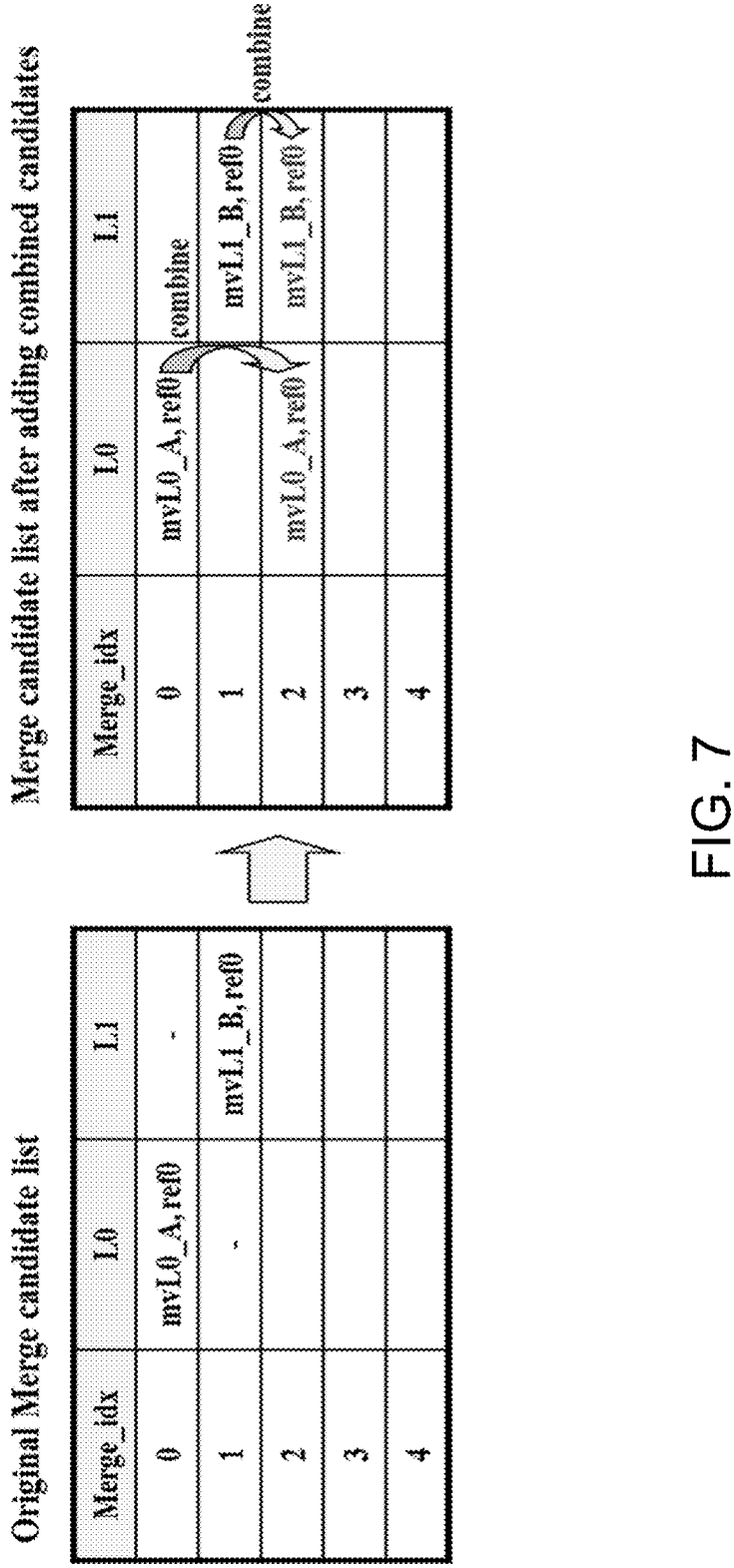
FIG. 7 shows an example of combined bi-predictive merge candidate.

Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

FIG. 7 shows an example of combined bi-predictive merge candidate.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP candidates

Figure 8:
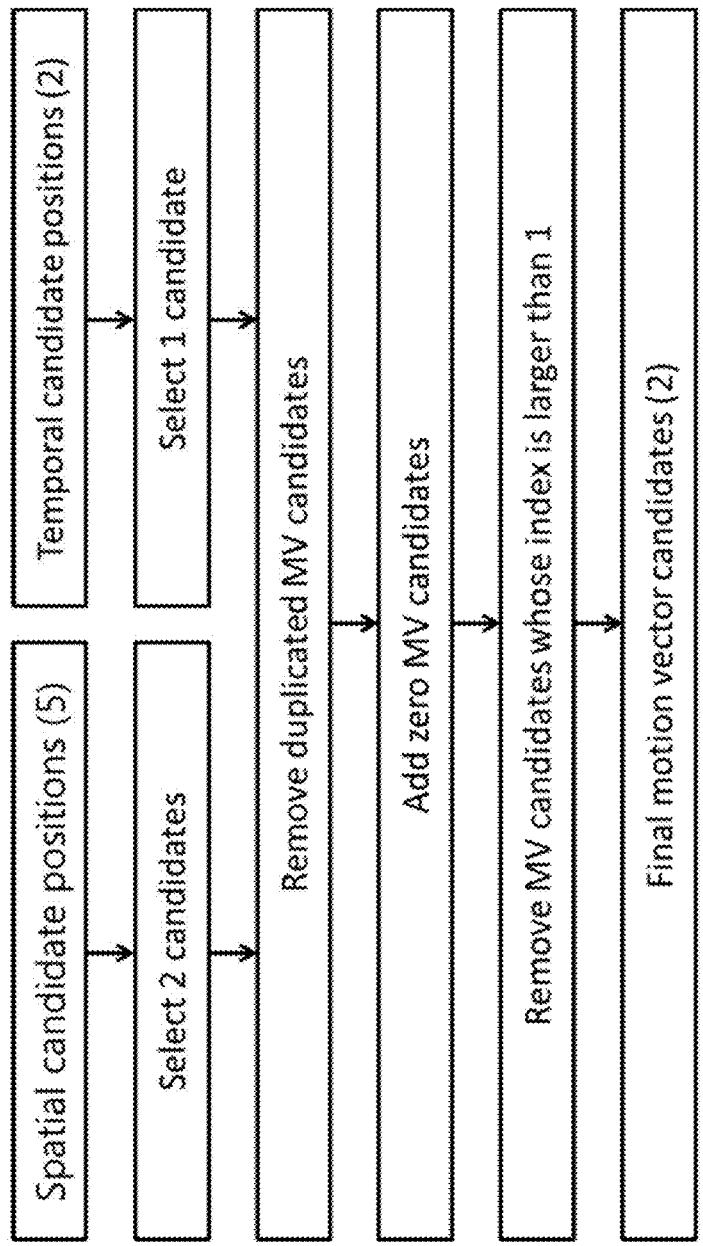
FIG. 8 summarizes derivation process for motion vector prediction candidate.

FIG. 8 summarizes derivation process for motion vector prediction candidate.

FIG. 8 shows an example of a derivation process for motion vector prediction candidates.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
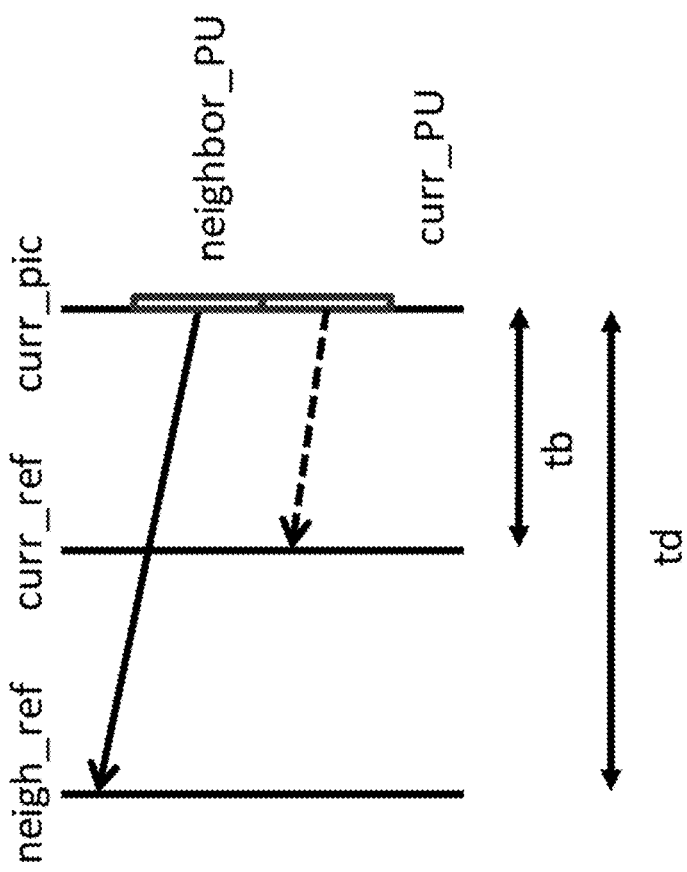
FIG. 9 is an illustration of motion vector scaling for spatial motion vector candidate.

FIG. 9 is an illustration of motion vector scaling for spatial motion vector candidate.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
2) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6. MMVD, TPM, CIIP rely on the regular merge list.
3) IBC merge list: it is done in a similar way as the regular merge list.

Similarly, there are three AMVP lists supported in VVC:
1) Affine AMVP candidate list
2) Regular AMVP candidate list
3) IBC AMVP candidate list: the same construction process as the IBC merge list due to the adoption of JVET-N0843

2.2.1 Coding Block Structure in VVC

In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIGS. 10A-10B, the affine motion field of the block is described by two control point motion vectors (CPMVs) for the 4-parameter affine model and 3 CPMVs for the 6-parameter affine model.

Figure 10A:
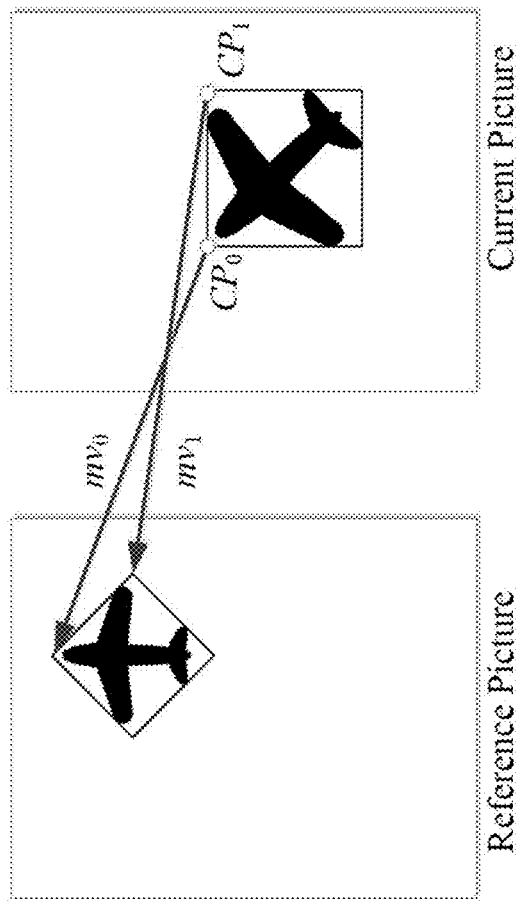
FIGS. 10A and 10B show a 4-parameter affine motion model and a 6-parameter affine motion model, respectively.
Figure 10B:
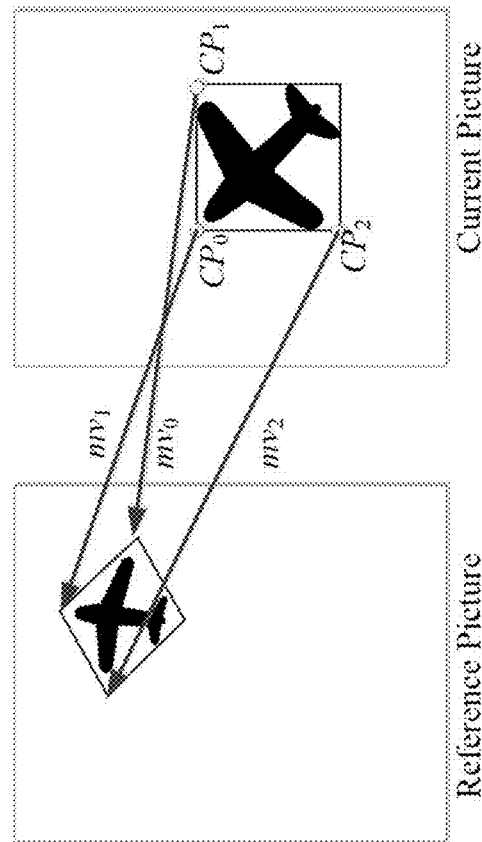

FIGS. 10A and 10B show: 10A: Simplified affine motion model-parameter affine, 10B: 6-parameter affine mode.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^v_0)$ is motion vector of the top-left corner control point, and $(mv^h_1, mv^v_1)$ is motion vector of the top-right corner control point and $(mv^h_2, mv^v_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 11:
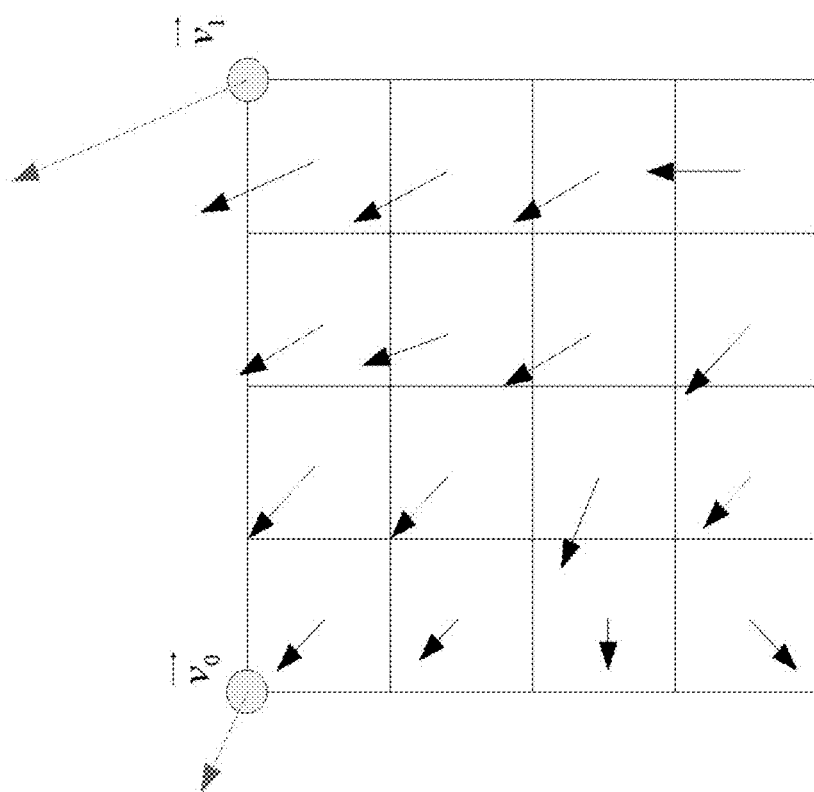
FIG. 11 is an example of an affine motion vector field (MVF) per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

FIG. 11 is an example of Affine MVF per sub-block.

After MCP, the high accuracy motion vector of each sub-block is rounded and saved as the same accuracy as the normal motion vector.

2.2.3 MERGE for Whole Block 2.2.3.1 Merge List Construction of Translational Regular Merge Mode 2.2.3.1.1 History-Based Motion Vector Prediction (HMVP)

Different from the merge list design, in VVC, the history-based motion vector prediction (HMVP) method is employed.

Figure 12:
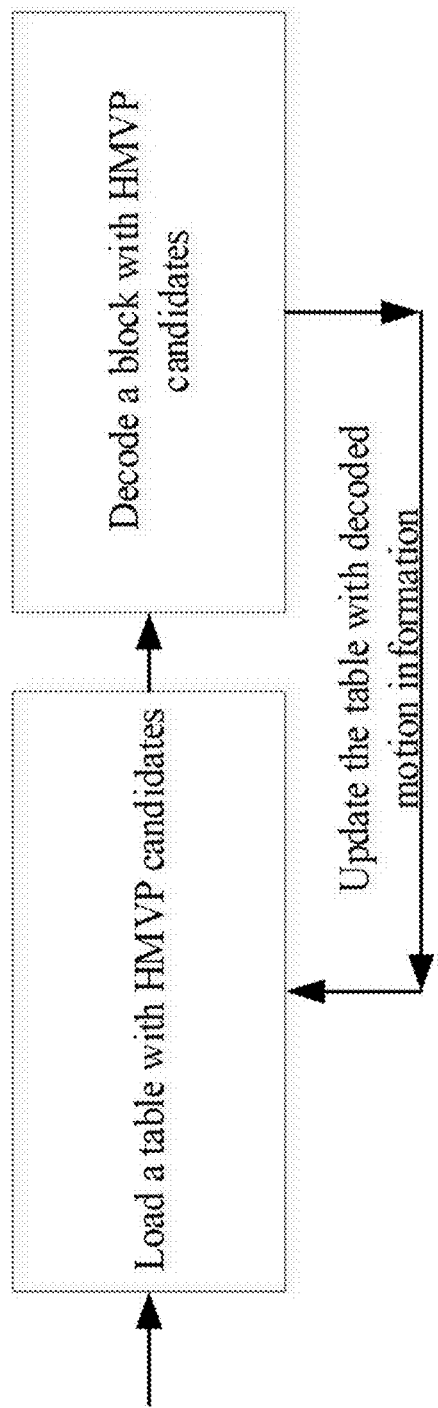
FIG. 12 shows examples of candidate positions for affine merge mode

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2 Regular Merge List Construction Process

Figure 13:
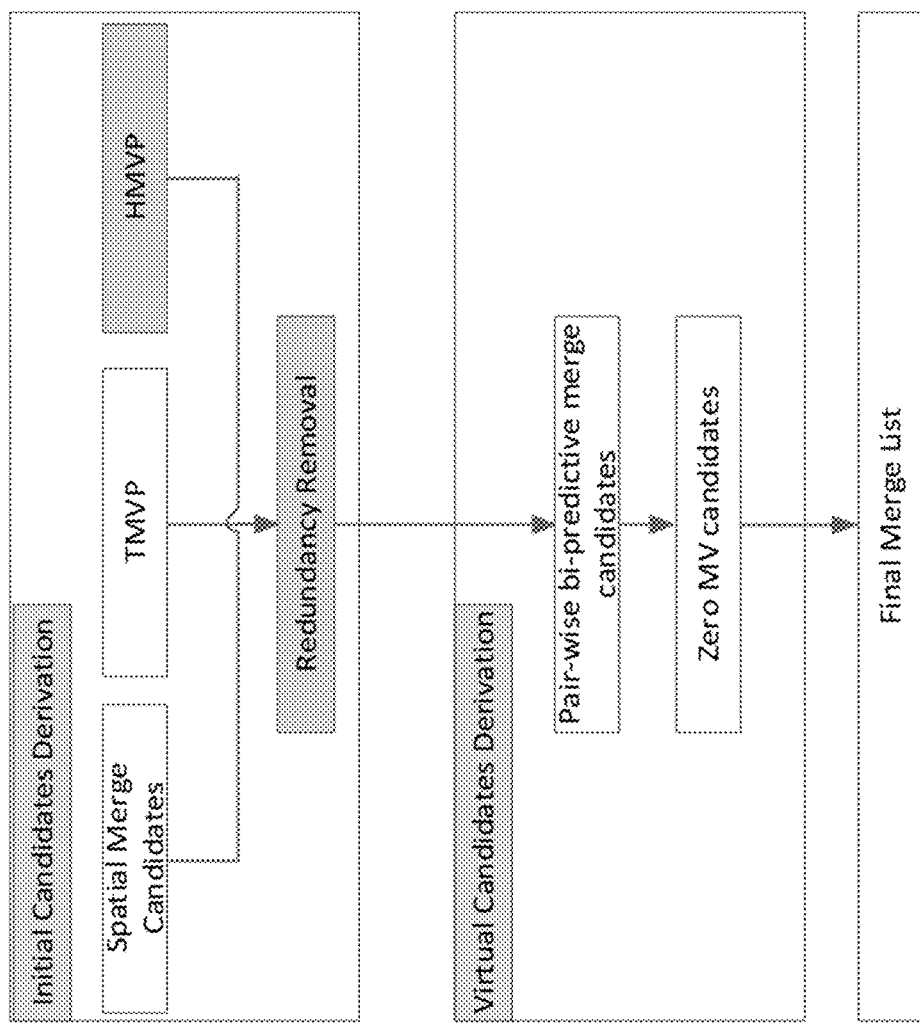
FIG. 13 shows an example of a modified merge list construction process.

The construction of the regular merge list (for translational motion) can be summarized according to the following sequence of steps:
Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 13 depicts The modified merge candidate list construction process (highlighted in blue). When the merge candidate list is not full after the TMVP candidate insertion, HMVP candidates stored in the HMVP table could be utilized to fill in the merge candidate list. Considering that one block usually has a higher correlation with the nearest neighboring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.3.2 Triangular Prediction Mode (TPM)

In VTM4, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signaled to indicate whether the triangle partition mode is applied or not.

When this mode is used, a CU is split evenly into two triangle-shaped partitions, using either the diagonal split or the anti-diagonal split, as depicted in FIG. 13. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

Figure 14:
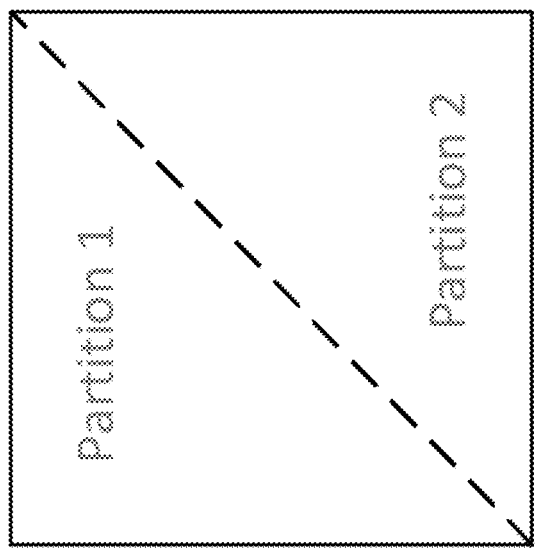
FIG. 14 shows examples of triangle partition based inter prediction.
Figure 14:
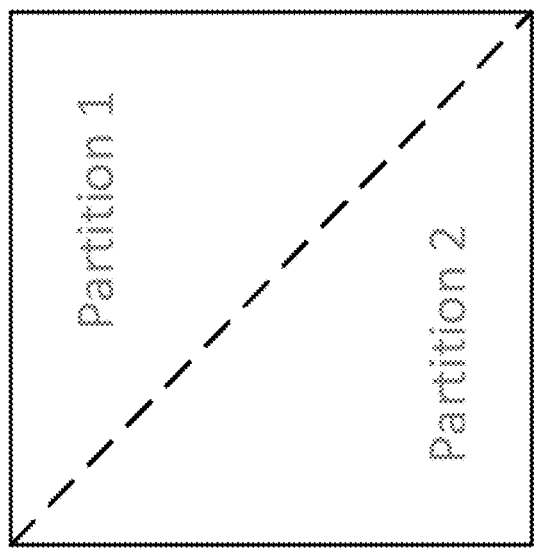

FIG. 14 shows examples of triangle partition based inter prediction.

If the CU-level flag indicates that the current CU is coded using the triangle partition mode, a flag indicating the direction of the triangle partition (diagonal or anti-diagonal), and two merge indices (one for each partition) are further signaled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.3.3 MMVD

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 15:
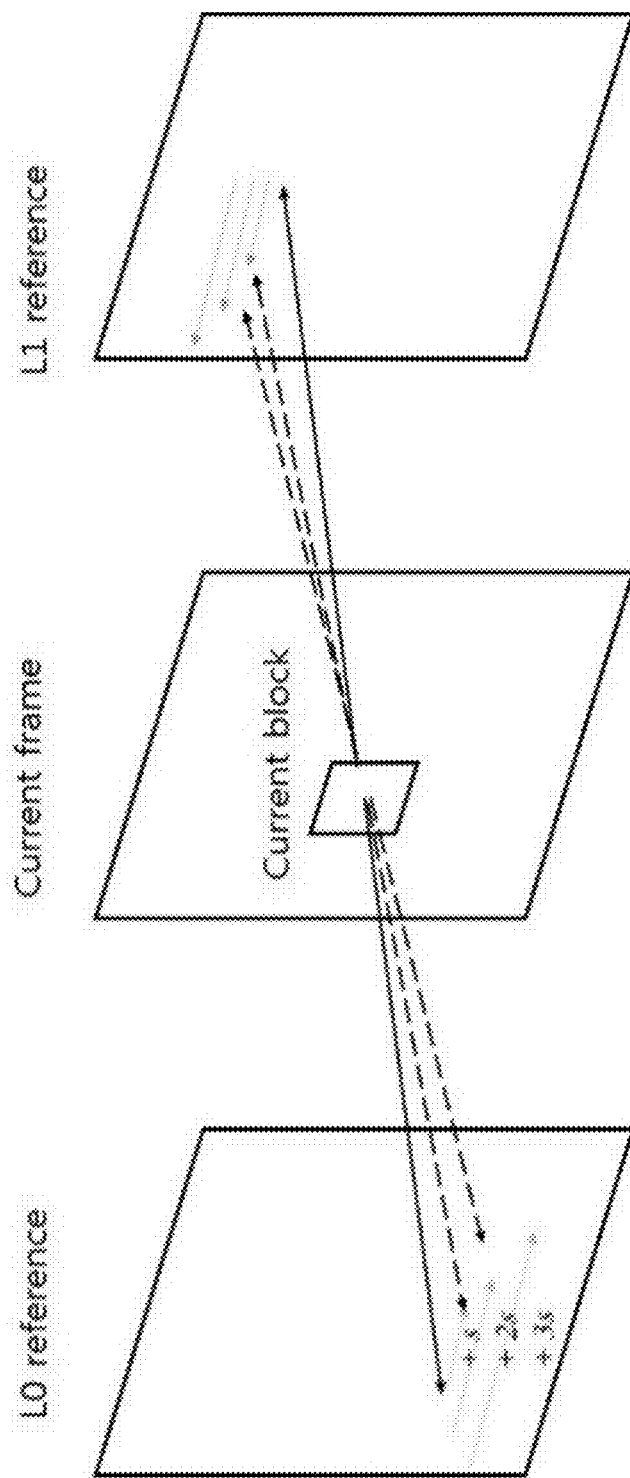
FIG. 15 shows an example of an ultimate motion vector expression (UMVE) search process.

FIG. 15 shows an example of UMVE Search Process.

Figure 16:
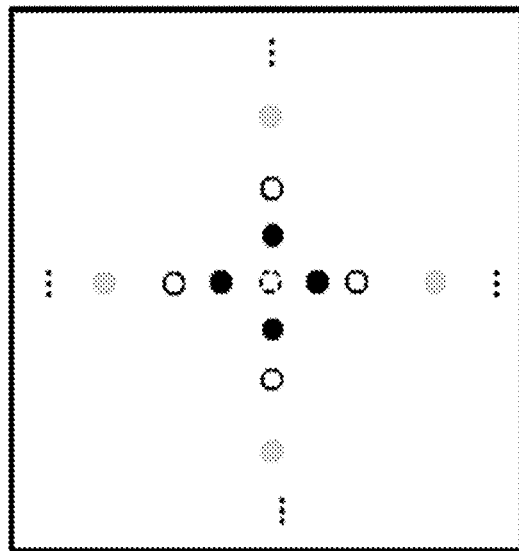
FIG. 16 shows an example of UMVE Search Point.
Figure 16:
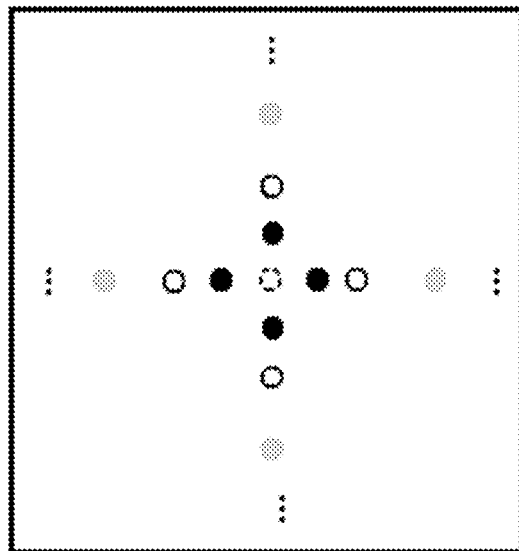

FIG. 16 shows an example of UMVE Search Point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.3.4 Combined Intra-Inter Prediction (CIIP)

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.2.4 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
  a. ATMVP candidate (maybe available or unavailable);
  b. Affine merge lists (including Inherited Affine candidates; and Constructed Affine candidates)
  c. Padding as zero MV 4-parameter affine model 2.2.4.1.1 ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

2.2.5 Regular Inter Mode (AMVP)

2.2.5.1 AMVP Motion Candidate List

Similar to the AMVP design in HEVC, up to 2 AMVP candidates may be derived. However, the HMVP candidates may also be added after the TMVP candidate. The HMVP candidates in the HMVP table are traversed in an ascending order of index (i.e., from index equal to 0, the oldest one). Up to 4 HMVP candidates may be checked to find whether its reference picture is the same as the target reference picture (i.e., same POC value).

2.2.5.2 AMVR

In HEVC, motion vector differences (MVDs) (between the motion vector and predicted motion vector of a PU) are signaled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.5.3 Symmetric motion vector difference in JVET-N1001-v2

In JVET-N1001-v2, symmetric motion vector difference (SMVD) is applied for motion information coding in bi-prediction.

Firstly, in slice level, variables RefIdxSymL0 and RefIdxSymL1 to indicate the reference picture index of list 0/1 used in SMVD mode, respectively, are derived with the following steps as specified in N1001-v2. When at least one of the two variables are equal to −1, SMVD mode shall be disabled.

2.2.6 Refinement of Motion Information 2.2.6.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 17:
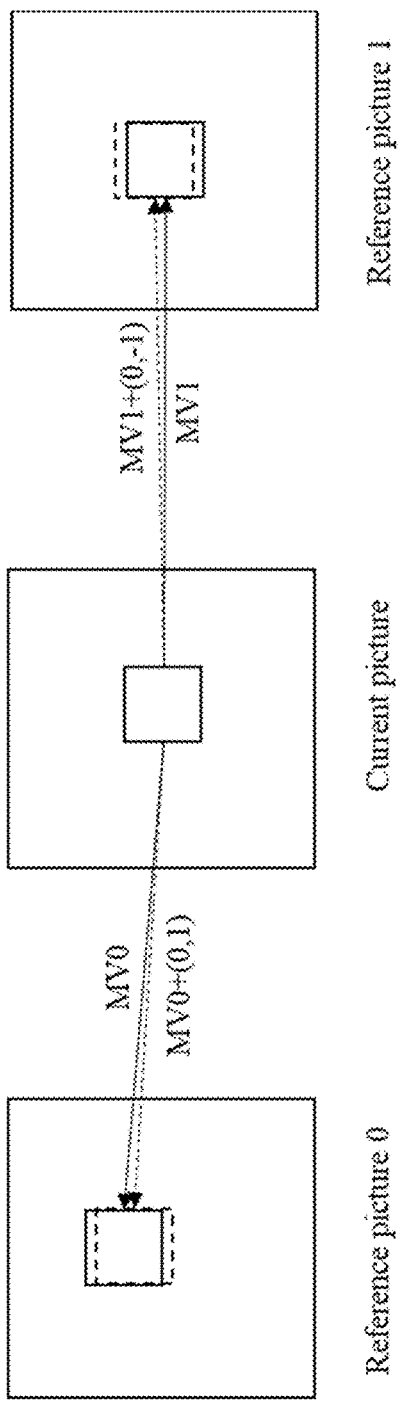
FIG. 17 shows an example of MVD (0, 1) mirrored between list 0 and list 1 in DMVR.

For DMVR in VVC, MVD mirroring between list 0 and list 1 is assumed as shown in FIG. 17, and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X-MvdX, L1Y-MvdY) in the list 1 reference picture.

Figure 18:
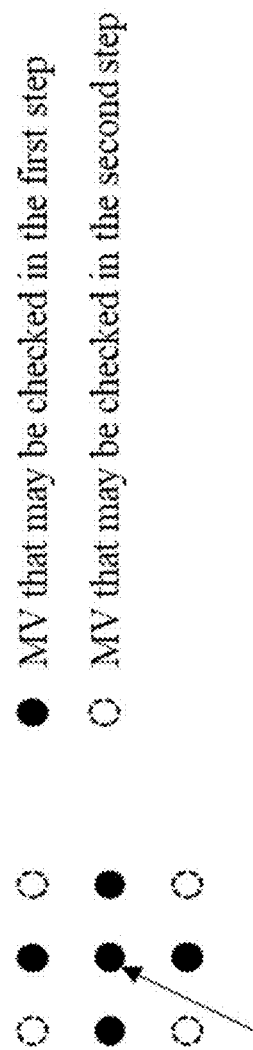
FIG. 18 shows an example of MVs that may be checked in one iteration.

The motion vector refinement process may iterate twice. In each iteration, at most 6 MVDs (with integer-pel precision) may be checked in two steps, as shown in FIG. 18. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:
  MvdX=−1;
  MvdY=−1;
  If(Sad(1, 0)<Sad(−1, 0))
    MvdX=1;
  If (Sad(0, 1)<Sad(0, −1))
    MvdY=1;

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

FIG. 17 shows an example of MVD (0, 1) mirrored between list 0 and list 1 in DMVR.

FIG. 18 shows an example of MVs that may be checked in one iteration.

To further simplify the process of DMVR, JVET-M0147 proposed several changes to the design in JEM. More specifically, the adopted DMVR design to VTM-4.0 (to be released soon) has the following main features:

Early termination when (0,0) position SAD between list0 and list1 is smaller than a threshold.

Early termination when SAD between list0 and list1 is zero for some position.

Block sizes for DMVR: W*H>=64 && H>=8, wherein W and H are the width and height of the block.

Split the CU into multiple of 16×16 sub-blocks for DMVR of CU size >16*16. If only width or height of the CU is larger than 16, it is only split in vertical or horizontal direction.

Reference block size (W+7)*(H+7) (for luma).

25 points SAD-based integer-pel search (i.e. (+−) 2 refinement search range, single stage)

Bilinear-interpolation based DMVR.

"Parametric error surface equation" based sub-pel refinement. This procedure is performed only when the minimum SAD cost is not equal to zero and the best MVD is (0, 0) in the last MV refinement iteration.

Luma/chroma MC w/ reference block padding (if needed).

Refined MVs used for MC and TMVPs only.

2.2.6.1.1 Usage of DMVR

When the following conditions are all true, DMVR may be enabled:

DMVR enabling flag in the SPS (i.e., sps_dmvr_enabled_flag) is equal to 1

TPM flag, inter-affine flag and subblock merge flag (either ATMVP or affine merge), MMVD flag are all equal to 0

Merge flag is equal to 1

Current block is bi-predicted, and POC distance between current picture and reference picture in list 1 is equal to the POC distance between reference picture in list 0 and current picture The current CU height is greater than or equal to 8

Number of luma samples (CU width*height) is greater than or equal to 64

2.2.6.1.2 "Parametric Error Surface Equation" Based Sub-Pel Refinement

The method is summarized below:

1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0,y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast-shifted subtraction-based implementation of the 2 divisions required per CU.

3. The computed $(x_0, y_0)$ are added to the integer distance refinement MV to get the sub-pixel accurate refinement delta MV.

2.2.6.2 Bi-Directional Optical Flow (BDOF)

2.3 Intra Block Copy

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 18, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

Figure 19:
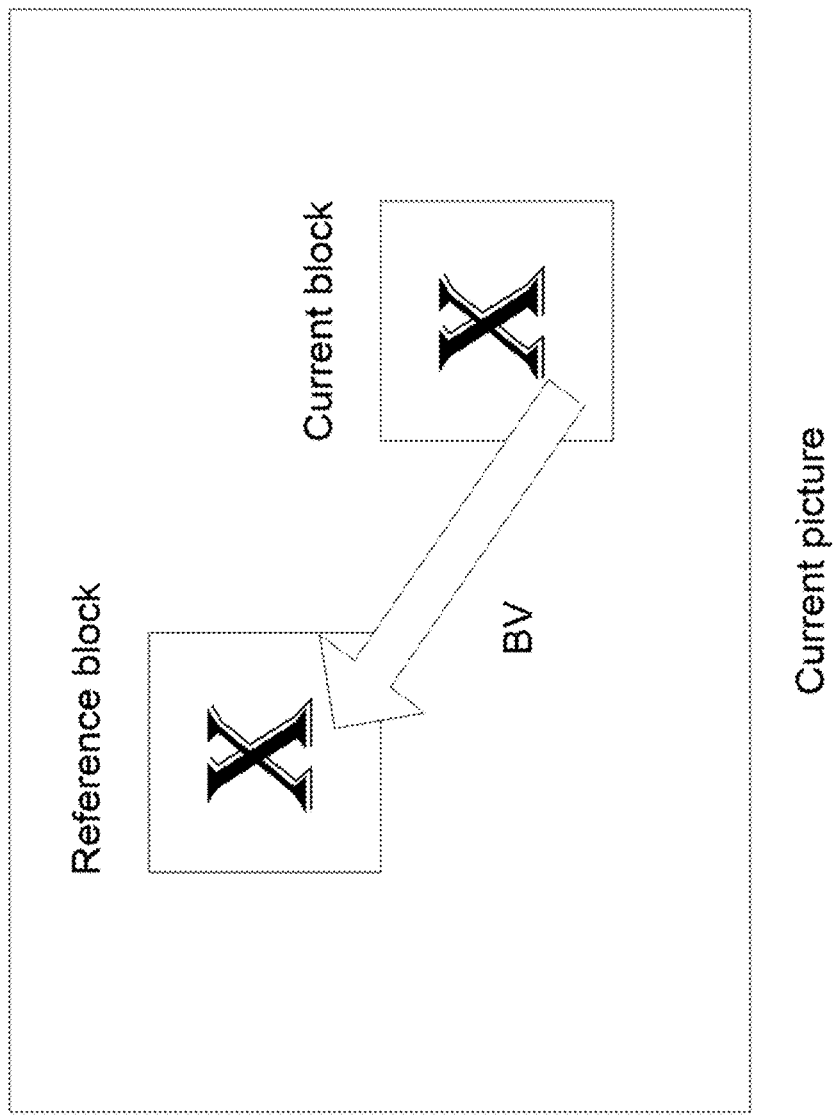
FIG. 19 shows an example of intra block copy (IBC).

FIG. 19 is an example of intra block copy.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3.1 IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates

Step 2: Insertion of HMVP candidates

Step 3: Insertion of pairwise average candidates

In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted.

Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
Check $A_0$, $A_1$ until an available candidate is found.
Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into (N>>1) *(M>>1) sub blocks.
2) Each sub block with a top left sample coordinated at (x, y) fetches the corresponding luma block covering the same top-left sample which is coordinated at (2x, 2y).
3) The encoder checks the block vector(bv) of the fetched luma block. If one of the following conditions is satisfied, the by is considered as invalid.
    a. A by of the corresponding luma block is not existing.
    b. The prediction block identified by a by is not reconstructed yet.
    c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid bv.

The decoding process of an IBC block is listed below. The part related to chroma motion vector derivation in a IBC mode is enclosed within double bolded braces, i.e., {{a}} indicates that "a" is related to chroma motion vector derivation in the IBC mode.

8.6.1 General Decoding Process for Coding Units Coded in IBC Prediction

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in ibc prediction mode consists of the following ordered steps:
1. The motion vector components of the current coding unit are derived as follows:
    1. If treeType is equal to SINGLE_TREE or DUAL_TREE_LUMA, the following applies:
        The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
        When treeType is equal to SINGLE_TREE, the derivation process for chroma motion vectors in clause 8.6.2.9 is invoked with luma motion vector mvL[0][0] as input, and chroma motion vector mvC[0][0] as output.
        The number of luma coding subblocks in horizontal direction numSbX and in vertical direction numSbY are both set equal to 1.
    1. Otherwise, if treeType is equal to DUAL_TREE_CHROMA, the following applies:
        The number of luma coding subblocks in horizontal direction numSbX and in vertical direction numSbY are derived as follows:

$$\text{num}SbX = (cb\text{Width} \gg 2) \tag{8-886}$$

$$\text{num}SbY = (cb\text{Height} \ll 2) \tag{8-887}$$

{{The chroma motion vectors mvC[xSbIdx][ySbIdx] are derived as follows for xSbIdx=0..numSbX−1, ySbIdx=0..numSbY−1:
    The luma motion vector mvL[xSbIdx][ySbIdx] is derived as follows:
        The location (xCuY, yCuY) of the collocated luma coding unit is derived as follows:

$$xCuY = xCb + xSb\text{Idx} * 4 \tag{8-888}$$

$$yCuY = yCb + ySb\text{Idx} * 4 \tag{8-889}$$

If CuPredMode[xCuY][yCuY] is equal to MODE_INTRA, the following applies.

mvL[xSbIdx][ySbIdx][0]=0  (8-890)

mvL[xSbIdx][ySbIdx][1]=0  (8-891)

predFlagL0[xSbIdx][ySbIdx]=0  (8-892)

predFlagL1[xSbIdx][ySbIdx]=0  (8-893)

Otherwise (CuPredMode[xCuY][yCuY] is equal to MODE_IBC), the following applies:

mvL[xSbIdx][ySbIdx][0]=MvL0[xCuY][yCuY][0]  (8-894)

mvL[xSbIdx][ySbIdx][1]=MvL0[xCuY][yCuY][1]  (8-895)

predFlagL0[xSbIdx][ySbIdx]=1  (8-896)

predFlagL1[xSbIdx][ySbIdx]=0  (8-897)}}

The derivation process for chroma motion vectors in clause 8.6.2.9 is invoked with mvL[xSbIdx][ySbIdx] as inputs, and mvC[xSbIdx][ySbIdx] as output.

It is a requirement of bitstream conformance that the chroma motion vector mvC[xSbIdx][ySbIdx] shall obey the following constraints:

When the derivation process for block availability as specified in clause 6.4.X [Ed. (BB): Neighboring blocks availability checking process tbd] is invoked with the current chroma location (xCurr, yCurr) set equal to (xCb/SubWidthC, yCb/SubHeightC) and the neighboring chroma location (xCb/SubWidthC+(mvC[xSbIdx][ySbIdx][0]>>5), yCb/SubHeightC+(mvC[xSbIdx][ySbIdx][1]>>5)) as inputs, the output shall be equal to TRUE.

When the derivation process for block availability as specified in clause 6.4.X [Ed. (BB): Neighboring blocks availability checking process tbd] is invoked with the current chroma location (xCurr, yCurr) set equal to (xCb/SubWidthC, yCb/SubHeightC) and the neighboring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output shall be equal to TRUE.

One or both of the following conditions shall be true:

(mvC[xSbIdx][ySbIdx][0]>>5)+xSbIdx*2+2 is less than or equal to 0.

(mvC[xSbIdx][ySbIdx][1]>>5)+ySbIdx*2+2 is less than or equal to 0.

2. The prediction samples of the current coding unit are derived as follows:

If treeType is equal to SINGLE_TREE or DUAL_TREE_LUMA, the prediction samples of the current coding unit are derived as follows:

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0..numSbX−1, and ySbIdx=0..numSbY−1, the variable cIdx set equal to 0 as inputs, and the ibc prediction samples (predSamples) that are an (cbWidth)×(cbHeight) array predSamples$_L$ of prediction luma samples as outputs.

Otherwise if treeType is equal to SINGLE_TREE or DUAL_TREE_CHROMA, the prediction samples of the current coding unit are derived as follows:

The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0..numSbX−1, and ySbIdx=0..numSbY−1 and the variable cIdx set equal to 1 as inputs, and the ibc prediction samples (predSamples) that are an (cbWidth/2)× (cbHeight/2) array predSamples$_{Cb}$ of prediction chroma samples for the chroma components Cb as outputs.

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0..numSbX−1, and ySbIdx=0..numSbY−1 and the variable cIdx set equal to 2 as inputs, and the ibc prediction samples (predSamples) that are an (cbWidth/2)× (cbHeight/2) array predSamples$_{Cr}$ of prediction chroma samples for the chroma components Cr as outputs.

3. The variables NumSbX[xCb][yCb] and NumSbY[xCb][yCb] are set equal to numSbX and numSbY, respectively.

4. The residual samples of the current coding unit are derived as follows:

When treeType is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

5. The reconstructed samples of the current coding unit are derived as follows:

When treeType is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

2.3.2 Recent Progress for IBC (in VTM5.0)
2.3.2.1 Single BV List

JVET-N0843 is adopted to the VVC. In the JVET-N0843, the BV predictors for merge mode and AMVP mode in IBC will share a common predictor list, which consist of the following elements:

2 spatial neighboring positions (A1, B1 as in FIG. 2)
5 HMVP entries
Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

2.3.2.1.1 Decoding Process
8.6.2.2 Derivation Process for IBC Luma Motion Vector Prediction This process is only invoked when CuPredMode[xCb][yCb] is equal to MODE_IBC, where (xCb, yCb) specify the top-left sample of the current luma coding block relative to the top-left luma sample of the current picture.

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma motion vectors in 1/16 fractional-sample accuracy mvL.

The variables xSmr, ySmr, smrWidth, smrHeight, and smrNumHmvpIbcCand are derived as follows:

$$xSmr = IsInSmr[xCb][yCb]?SmrX[xCb][yCb]:xCb \quad (8\text{-}910)$$

$$ySmr = IsInSmr[xCb][yCb]?SmrY[xCb][yCb]:yCb \quad (8\text{-}911)$$

$$smrWidth = IsInSmr[xCb][yCb]?SmrW[xCb][yCb]:cbWidth \quad (8\text{-}912)$$

$$smrHeight = IsInSmr[xCb][yCb]?SmrH[xCb][yCb]:cbHeight \quad (8\text{-}913)$$

$$smrNumHmvpIbcCandIsInSmr[xCb][yCb]?NumHmvpSmrIbcCand:NumHmvpIbcCand \quad (8\text{-}914)$$

The luma motion vector mvL is derived by the following ordered steps:

1. The derivation process for spatial motion vector candidates from neighboring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlagA$_1$, availableFlagB$_1$ and the motion vectors mvA$_1$ and mvB$_1$.

2. The motion vector candidate list, mvCandList, is constructed as follows:

i=0 if(availableFlagA$_1$)

mvCandList[i++]=mvA$_1$ \quad (8-915)

if(availableFlagB$_1$)

mvCandList[i++]=mvB$_1$

3. The variable numCurrCand is set equal to the number of merging candidates in the mvCandList.

4. When numCurrCand is less than MaxNumMergeCandand and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.

5. When numCurrCand is less than MaxNumMergeCand, the following applies until numCurrCand is equal to MaxNumMergeCand:

1. mvCandList[numCurrCand][0] is set equal to 0.
   2. mvCandList[numCurrCand][1] is set equal to 0.
   3. numCurrCand is increased by 1.

6. The variable mvIdx is derived as follows:

mvIdx=general_merge_flag[$xCb$][$yCb$]?merge_idx[$xCb$][$yCb$]:mvp_l0_flag[$xCb$][$yCb$]   (8-916)

7. The following assignments are made:

mvL[0]=mergeCandList[mvIdx][0]   (8-917)

mvL[1]=mergeCandList[mvIdx][1]   (8-918)

2.3.2.2 Size Restriction of IBC

In the latest VVC and VTM5, it is proposed to explicitly use syntax constraint for disabling 128×128 IBC mode on top of the current bitstream constraint in the previous VTM and VVC versions, which makes presence of IBC flag dependent on CU size <128×128.

2.3.2.3 Shared Merge List for IBC

To reduce the decoder complexity and support parallel encoding, JVET-M0147 proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:

If the block has luma samples no larger than 32, and split to 2⁴×4 child blocks, sharing merge lists between very small blocks (e.g. two adjacent 4×4 blocks) is used.

If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to IBC merge mode.

2.4 Syntax Tables and Semantics for Coding Unit and Merge Mode

7.3.5.1 General Slice Header Syntax

| slice_header( ) { | Descriptor |
|---|---|
| slice_pic_parameter_set_id | ue(v) |
| if( rect_slice_flag \|\| NumBricksInPic > 1) | |
| slice_address | u(v) |
| if( !rect_slice_flag && !single_brick_per_slice_flag ) | |
| num_bricks_in_slice_minus1 | ue(v) |
| slice_type | ue(v) |
| ... | |
| {{ if ( slice_type != I ) }}{ | |
| if( sps_temporal_mvp_enabled_flag ) | |
| slice_temporal_mvp_enabled_flag | u(1) |
| if( slice_type = = B ) | |
| mvd_l1_zero_flag | u(1) |
| if( cabac_init_present_flag ) | |
| cabac_init_flag | u(1) |
| if( slice_temporal_mvp_enabled_flag ) { | |
| if( slice_type = = B ) | |
| collocated_from_l0_flag | u(1) |
| } | |
| if( ( weighted_pred_flag && slice_type = = P ) \|\| | |
| ( weighted_bipred_flag && slice_type = = B ) ) | |
| pred_weight_table( ) | |
| {{ six_minus_max_num_merge_cand }} | ue(v) |
| {{ if( sps_affine_enabled_flag ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_triangle_enabled_flag && MaxNumMergeCand >= 2) | |
| max_num_merge_cand_minus_max_num_triangle_cand | ue(v) |
| }else if ( sps_ibc_enabled_flag ) | |
| six_minus_max_num_merge_cand }} | ue(v) |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| ... | |
| byte_alignment( ) | |
| } | |

7.3.7.5 Coding Unit Syntax

| coding_unit( x0, y0, cbWidth, cbHeight, treeType) { | Descriptor |
|---|---|
| if( slice_type != I \|\| sps_ibc_enabled_flag ) { | |
| if( treeType != DUAL_TREE_CHROMA && | |
| !( cbWidth = = 4 && cbHeight = = 4 && !sps_ibc_enabled_flag ) ) | |
| cu_skip_flag[ x0 ][ y0 ] | ae(v) |
| if( cu_skip_flag[ x0 ][ y0 ] = = 0 && slice_type != I | |
| && !( cbWidth = = 4 && cbHeight = = 4 ) ) | |
| pred_mode_flag | ae(v) |
| if( ( ( slice_type = = I && cu_skip_flag[ x0 ][ y0 ] = =0) \|\| | |
| ( slice_type != I && ( CuPredMode[ x0 ][ y0 ]!=MODE_INTRA \|\| | |
| ( cbWidth = = 4 && cbHeight = = 4 && cu_skip_flag[ x0 ][ y0 ] = = 0 ) ) ) ) && | |
| sps_ibc_enabled_flag && ( cbWidth !=128 \|\| cbHeight != 128 ) ) | |
| pred_mode_ibc_flag | ae(v) |
| } | |
| if( CuPredMode[ x0 ][ y0 ] = = MODE_INTRA ) { | |
| ... | |
| } | |
| }else if( treeType !=DUAL_TREE_CHROMA ) {/* MODE_INTER or MODE_IBC */ | |
| if( cu_skip_flag[ x0 ][ y0 ] = = 0) | |
| general_merge_flag[ x0 ][ y0 ] | ae(v) |
| if( general_merge_flag[ x0 ][ y0 ]) { | |
| merge_data( x0, y0, cbWidth, cbHeight ) | |
| {{ }else if ( CuPredMode[ x0 ][ y0 ] = = MODE_IBC ) { | |
| mvd_coding(x0, y0, 0, 0) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_precision_flag[ x0 ][ y0 ] | ae(v) |
| } }} | |

```
coding_unit( x0, y0, cbWidth, cbHeight, treeType) {                                        Descriptor
    } else {
        if( slice_type == B )
            inter_pred_idc[ x0 ][ y0 ]                                                     ae(v)
        if( sps_affine_enabled_flag && cbWidth >= 16 && cbHeight >=16 ) {
            inter_affine_flag[ x0 ][ y0 ]                                                  ae(v)
            if( sps_affine_type_flag && inter_affine_flag[ x0 ][ y0 ] )
                cu_affine_type_flag[ x0 ][ y0 ]                                            ae(v)
        }
        if( sps_smvd_enabled_flag && inter_pred_idc[ x0 ][ y0 ] == PRED_BI &&
            !inter_affine_flag[ x0 ][ y0 ] && RefIdxSymL0 >-1 && RefIdxSymL1 >-1 )
            sym_mvd_flag[ x0 ][ y0 ]                                                       ae(v)
    ...
    }
}
```

7.3.7.7 Merge Data Syntax

```
merge_data( x0, y0, cbWidth, cbHeight) {                                                   Descriptor
{{if ( CuPredMode[ x0 ][ y0 ] == MODE_IBC ) {
    if( MaxNumMergeCand > 1 )
        merge_idx[ x0 ][ y0 ]                                                              ae(v)
} else { }}
    if( sps_mmvd_enabled_flag || cbWidth * cbHeight != 32)
        regular_merge_flag[ x0 ][ y0 ]                                                     ae(v)
    if ( regular_merge_flag[ x0 ][ y0 ] == 1 ){
        if( MaxNumMergeCand > 1 )
            merge_idx[ x0 ][ y0 ]                                                          ae(v)
    }else {
        if( sps_mmvd_enabled_flag && cbWidth * cbHeight != 32 )
            mmvd_merge_flag[ x0 ][ y0 ]                                                    ae(v)
        if( mmvd_merge_flag[ x0 ][ y0 ] == 1 ) {
            if( MaxNumMergeCand > 1)
                mmvd_cand_flag[ x0 ][ y0 ]                                                 ae(v)
            mmvd_distance_idx[ x0 ][ y0 ]                                                  ae(v)
            mmvd_direction_idx[ x0 ][ y0 ]                                                 ae(v)
        }else {
            if( MaxNumSubblockMergeCand > 0 && cbWidth >= 8 && cbHeight >= 8 )
                merge_subblock_flag[ x0 ][ y0 ]                                            ae(v)
            if(merge_subblock_flag[ x0 ][ y0 ] == 1) {
                if( MaxNumSubblockMergeCand > 1 )
                    merge_subblock_idx[ x0 ][ y0 ]                                         ae(v)
            }else {
                if( sps_ciip_enabled_flag && cu_skip_flag[ x0 ][ y0 ] == 0 &&
                    ( cbWidth * cbHeight) >= 64 && cbWidth < 128 && cbHeight < 128 ) {
                    ciip_flag[ x0 ][ y0 ]                                                  ae(v)
                    if( ciip_flag[ x0 ][ y0 ] && MaxNumMergeCand > 1 )
                        merge_idx[ x0 ][ y0 ]                                              ae(v)
                }
                if( MergeTriangleFlag[ x0 ][ y0 ] ) {
                    merge_triangle_split_dir[ x0 ][ y0 ]                                   ae(v)
                    merge_triangle_idx0[ x0 ][ y0 ]                                        ae(v)
                    merge_triangle_idx1[ x0 ][ y0 ]                                        ae(v)
                }
            }
        }
    }
}
```

7.4. General Slice Header Semantics six_minus_max_num_merge_cand specifies the maximum number of merging motion vector prediction (MVP) candidates supported in the slice subtracted from 6. The maximum number of merging MVP candidates, MaxNumMergeCand is derived as follows:

$$MaxNumMergeCand = 6 - six\_minus\_max\_num\_merge\_cand \quad (7\text{-}57)$$

The value of MaxNumMergeCand shall be in the range of 1 to 6, inclusive.

five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

$$MaxNumSubblockMergeCand = 5 - five\_minus\_max\_num\_subblock\_merge\_cand \quad (7\text{-}58)$$

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode. pred_mode_flag equal to 1 specifies that the current coding unit is coded in intra prediction mode. When pred_mode_flag is not present, it is inferred as follows:

If cbWidth is equal to 4 and cbHeight is equal to 4, pred_mode_flag is inferred to be equal to 1.

Otherwise, pred_mode_flag is inferred to be equal to 1 when decoding an I slice, and equal to 0 when decoding a P or B slice, respectively.

The variable CuPredMode[x][y] is derived as follows for x=x0..x0+cbWidth−1 and y=y0..y0+cbHeight−1:

If pred_mode_flag is equal to 0, CuPredMode[x][y] is set equal to MODE_INTER.

Otherwise (pred_mode_flag is equal to 1), CuPredMode[x][y] is set equal to MODE_INTRA. pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:

If cu_skip_flag[x0][y0] is equal to 1, and cbWidth is equal to 4, and cbHeight is equal to 4, pred_mode_ibc_flag is inferred to be equal to 1.

Otherwise, if both cbWidth and cbHeight are equal to 128, pred_mode_ibc_flag is inferred to be equal to 0.

Otherwise, pred_mode_ibc_flag is infered to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0..x0+cbWidth−1 and y=y0..y0+cbHeight−1.

general_merge_flag[x0][y0] specifies whether the inter prediction parameters for the current coding unit are inferred from a neighboring inter-predicted partition. The array indices x0, y0 specify the location (x, y0) of the top-left luma sample of the considered coding block relative to the top-left luma sample of the picture.

When general_merge_flag[x0][y0] is not present, it is inferred as follows:

If cu_skip_flag[x0][y0] is equal to 1, general_merge_flag[x0][y0] is inferred to be equal to 1.

Otherwise, general_merge_flag[x0][y0] is inferred to be equal to 0.

mvp_l0_flag[x0][y0] specifies the motion vector predictor index of list 0 where x0, y0 specify the location (x, y0) of the top-left luma sample of the considered coding block relative to the top-left luma sample of the picture.

When mvp_l0_flag[x0][y0] is not present, it is inferred to be equal to 0.

mvp_l1_flag[x0][y0] has the same semantics as mvp_l0_flag, with l0 and list 0 replaced by l1 and list 1, respectively.

inter_pred_idc[x0][y0] specifies whether list0, list1, or bi-prediction is used for the current coding unit according to Table 7-10. The array indices x0, y0 specify the location (x, y0) of the top-left luma sample of the considered coding block relative to the top-left luma sample of the picture.

TABLE 7-10

Name association to inter prediction mode

| | Name of inter_pred_idc | | |
|---|---|---|---|
| inter_pred_idc | ( cbWidth + cbHeight ) > 12 | ( cbWidth + cbHeight ) = = 12 | ( cbWidth + cbHeight ) = = 8 |
| 0 | PRED_L0 | PRED_L0 | n.a. |
| 1 | PRED_L1 | PRED_L1 | n.a. |
| 2 | PRED_BI | n.a. | n.a. |

When inter_pred_idc[x][y0] is not present, it is inferred to be equal to PRED_L0.

7.4.8.7 Merge Data Semantics regular_merge_flag[x][y0] equal to 1 specifies that regular merge mode is used to generate the inter prediction parameters of the current coding unit. The array indices x0, y0 specify the location (x, y0) of the top-left luma sample of the considered coding block relative to the top-left luma sample of the picture.

When regular_merge_flag[x0][y0] is not present, it is inferred as follows:

If all the following conditions are true, regular_merge_flag[x][y0] is inferred to be equal to 1:

sps_mmvd_enabled_flag is equal to 0.

general_merge_flag[x][y0] is equal to 1.

cbWidth*cbHeight is equal to 32.

Otherwise, regular_merge_flag[x][y0] is inferred to be equal to 0.

mmvd_merge_flag[x][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:

If all the following conditions are true, mmvd_merge_flag[x][y0] is inferred to be equal to 1:

sps_mmvd_enabled_flag is equal to 1.

general_merge_flag[x0][y0] is equal to 1.

cbWidth*cbHeight is equal to 32.

regular_merge_flag[x][y0] is equal to 0.

Otherwise, mmvd_merge_flag[x][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture. When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance[ x0 ][ y0 ] based on mmvd_distance_idx[ x0 ][ y0 ].

| mmvd_distance_idx[ x0 ][ y0 ] | MmvdDistance[ x0 ][ y0 ] | |
|---|---|---|
| | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 7-13. The array indices x0, y0 specify the location (x, y0) of the top-left luma sample of the considered coding block relative to the top-left luma sample of the picture.

TABLE 7-13

Specification of MmvdSign[ x0 ][ y0 ] based on mmvd_direction_idx[ x0 ][ y0 ]

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

MmvdOffset[x0][y0][0]=(MmvdDistance [x0][y0]<<2)*MmvdSign[x0][y0][0]   (7-124)

MmvdOffset[x0][y0][1]=(MmvdDistance[x0] [y0]<<2)*MmvdSign[x0][y0][1]   (7-125)

merge_subblock_flag[x0][y0] specifies whether the subblock-based inter prediction parameters for the current coding unit are inferred from neighboring blocks. The array indices x0, y0 specify the location (x, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb..xCb+cbWidth−1 and y=yCb..yCb+cbHeight−1 is set to be equal to INTRA_PLANAR. The variable MergeTriangleFlag[x0][y0], which specifies whether triangular shape based motion compensation is used to generate the prediction samples of the current coding unit, when decoding a B slice. is derived as follows:
  If all the following conditions are true, MergeTriangleFlag[x0][y0] is set equal to 1:
    sps_triangle_enabled_flag is equal to 1.
    slice_type is equal to B.
    general_merge_flag[x0][y0] is equal to 1.
    MaxNumTriangleMergeCand is greater than or equal to 2.
    cbWidth*cbHeight is greater than or equal to 64.
    regular_merge_flag[x0][y0] is equal to 0.
    mmvd_merge_flag[x0][y0] is equal to 0.
    merge_subblock_flag[x0][y0] is equal to 0.
    ciip_flag[x0][y0] is equal to 0.
  Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x, y0) of the top-left luma sample of the considered coding block relative to the top-left luma sample of the picture.

When merge_triangle_idx1[x0][y0] is not present, it is inferred to be equal to 0.

merge_idx[x0][y0] specifies the merging candidate index of the merging candidate list where x0, y0 specify the location (x, y0) of the top-left luma sample of the considered coding block relative to the top-left luma sample of the picture.

When merge_idx[x0][y0] is not present, it is inferred as follows:
  If mmvd_merge_flag[x0][y0] is equal to 1, merge_idx [x0][y0] is inferred to be equal to mmvd_cand_flag [x0][y0].
  Otherwise (mmvd_merge_flag[x0][y0] is equal to 0), merge_idx[x0][y0] is inferred to be equal to 0.

3 Examples of Technical Problems Solved by Embodiments

The current IBC may have the following problems:
1. For P/B slices, how many IBC motion (BV) candidates could be added to the IBC motion list is set to be the same as the regular merge list size. Therefore, if regular merge mode is disabled, IBC merge mode is disabled too. However, it is desirable to enable IBC merge mode even when the regular merge mode is disabled considering its huge gains.
2. The IBC AMVP and IBC merge mode share the same motion (BV) candidate list construction process. The list size indicated by the maximum number of merge candidates (e.g., MaxNumMergeCand) is signaled in the slice header. For the IBC AMVP case, the BV predictor could be only selected from one of two IBC motion candidates.
   a. When the BV candidate list size is 1, in this case, the signaling of BV predictor index is not necessary.
   b. When the BV candidate list size is 0, both IBC merge and AMVP mode shall be disabled. However, in current design, BV predictor index is still signaled.
3. IBC may be enabled in sequence level, however, due to the signaled BV list size, IBC may be disabled but indications of IBC mode and related syntax are still signaled which wastes bits.

4 Example Techniques and Embodiments

The detailed inventions below should be considered as examples to explain general concepts. These inventions should not be interpreted in a narrow way. Furthermore, these inventions can be combined in any manner.

In this invention, decoder side motion vector derivation (DMVD) includes methods like DMVR and FRUC which perform motion estimation to derive or refine the block/sub-block motion information, and BIO which performs sample-wise motion refinement.

Denote the maximum number of BV candidates (i.e., BV candidate list size), based on which a BV could be derived or predicted, in the BV candidate list by maxIBCCandNum.

Denote the maximum number of IBC merge candidates as maxIBCMrgNum, the maximum number of IBC AMVP candidates as maxIBCAMVPNum. Note that skip mode may be treated as a special merge mode with all coefficients equal to 0.
1. IBC (e.g., IBC AMVP and/or IBC merge) mode may be disabled for a picture/slice/tile/tile group/brick or other video units even IBC is enabled for a sequence.
   a. In one example, an indication of whether IBC AMVP and/or IBC merge mode is enabled may be signaled in picture/slice/tile/tile group/brick or other video units-level, such as in PPS, APS, slice header, picture header, etc. al.
      i. In one example, the indication may be a flag.
      ii. In one example, the indication may be a number of allowed BV predictors. When the number of allowed BV preidctors is equal to 0, it indicates that IBC AMVP and/or merge mode is disabled.
         1) Alternatively, the number of allowed BV predictors may be signaled in a predictive way.
            a. For example, X minus the number of allowed BV predictors may be signaled, where X is a fixed number such as 2.
      iii. Alternatively, furthermore, the indication may be conditionally signaled, such as based on whether the video content is screen content, or sps_ibc_enabled_flag.
   b. In one example, IBC mode may be disabled when the video content is not screen content (such as camera-captured or mixed content).
   c. In one example, IBC mode may be disabled when the video content is camera-captured content.
2. Whether to signal the usage of IBC (e.g., pred_mode_ibc_flag) and IBC related syntax elements may depend on maxIBCCandNum (e.g., maxIBCCandNum is set equal to MaxNumMergeCand).
   a. In one example, when maxIBCCandNum is equal to 0, the signaling of usage of IBC skip mode (e.g., cu_skip_flag) for I slices may be skipped, and IBC is inferred to be disabled.
   b. In one example, when maxIBCMrgNum is equal to 0, the signaling of usage of IBC skip mode (e.g., cu_skip_flag) for I slices may be skipped, and IBC skip mode is inferred to be disabled.
   c. In one example, when maxIBCCandNum is equal to 0, the signaling of usage of IBC merge/IBC AMVP mode (e.g., pred_mode_ibc_flag) may be skipped, and IBC is inferred to be disabled.
   d. In one example, when maxIBCCandNum is equal to 0 and current block is coded with IBC mode, signaling of merge mode (e.g., general_merge_flag) may be skipped and IBC merge mode is inferred to be disabled.
      i. Alternatively, the current block is inferred to be coded with IBC AMVP mode.
   e. In one example, when maxIBCMrgNum is equal to 0 and current block is coded with IBC mode, signaling of merge mode (e.g., general_merge_flag) may be skipped and IBC merge mode is inferred to be disabled.
      i. Alternatively, the current block is inferred to be coded with IBC AMVP mode.
3. Whether to signal the motion vector difference related sytax elements for IBC AMVP mode may depend on maxIBCCandNum (e.g., maxIBCCandNum is set equal to MaxNumMergeCand).
   a. In one example, when maxIBCCandNum is equal to 0, the signaling of motion vector predictor index for IBC AMVP mode (e.g., mvp_l0_flag) may be skipped, and IBC AMVP mode is inferred to be disabled.
   b. In one example, when maxIBCCandNum is equal to 0, the signaling of motion vector differences (e.g., mvd_coding) may be skipped, and IBC AMVP mode is inferred to be disabled.
   c. In one example, motion vector predictor index and/or precision of motion vector predictor and/or precision of motion vector differences for IBC AMVP mode may be coded under the condition of maxIBCCandNum greater than K (e.g., K=0 or 1).
      i. In one example, motion vector predictor index for IBC AMVP mode (e.g., mvp_l0_flag) may not be signaled if maxIBCCandNum is equal to 1.
         1) In one example, motion vector predictor index for IBC AMVP mode (e.g., mvp_l0_flag) may be inferred to be a value such as 0 in this case.
      ii. In one example, signaling of precision of motion vector predictor and/or precision of motion vector differences for IBC AMVP mode (e.g., amvr_precision_flag) may be skipped if maxIBCCandNum is equal to 0.
   iii. In one example, signaling of precision of motion vector predictor and/or precision of motion vector differences for IBC AMVP mode (e.g., amvr_precision_flag) may be under the condition that maxIBCCandNum is greater than 0.
4. It is proposed that maxIBCCandNum may be decoupled from the maximum number of regular merge candidates.
   a. In one example, maxIBCCandNum may be directly signaled.
      i. Alternatively, when IBC is enabled for a slice, a conformance bitstream shall satisfy that maxIBCCandNum is greater than 0.
   b. In one example, predictive coding of maxIBCCandNum and other syntax elements/fixed values may be signaled.
      i. In one example, the difference between regular merge list size and maxIBCCandNum may be coded.
      ii. In one example, (K minus maxIBCCandNum) may be coded, e.g., K=5 or 6. iii. In one example, (maxIBCCandNum minus K) may be coded, e.g., K=0 or 2.
   c. In one example, indications of maxIBCMrgNum and/or maxIBCAMVPNum may be signaled according to methods mentioned above.
5. maxIBCCandNum may be set equal to Func (maxIBCMrgNum, maxIBCAMVPNum)
   a. In one example, maxIBCAMVPNum is fixed to be 2, and maxIBCCandNum is set to Func (maxIBCMrgNum, 2).
   b. In one example, Func (a, b) returns the larger value between two variables a and b.
6. maxIBCCandNum may be determined according to the coded mode information of one block. That is, how many BV candidates may be added to the BV candidate list may depend on the mode information of the block.
   a. In one example, maxIBCCandNum may be set equal to maxIBCMrgNum if one block is coded with IBC merge mode.
   b. In one example, maxIBCCandNum may be set equal to maxIBCAMVPNum if one block is coded with IBC AMVP mode.
7. A conformance bitstream shall satisfy that the decoded IBC AMVP or IBC merge index is smaller than maxIBCCandNum.
   a. In one example, a conformance bitstream shall satisfy that the decoded IBC AMVP index is smaller than maxIBCAMVPNum.
   b. In one example, a conformance bitstream shall satisfy that the decoded IBC merge index is smaller than maxIBCMrgNum (e.g., 2).
8. When an IBC AMVP or IBC merge candidate index couldn't identify a BV candidate in the BV candidate list (e.g., the IBC AMVP or merge candidate index is not smaller than maxIBCCandNum, or the decoded IBC AMVP index is not smaller than maxIBCAMVPNum, or the decoded IBC merge index is not smaller than maxIBCMrgNum), a default prediction block may be utilized.
   a. In one example, all samples in the default prediction block are set to (1<<(Bit depth−1)).
   b. In one example, a default BV may be assigned to the block.
9. When an IBC AMVP or IBC merge candidate index couldn't identify a BV candidate in the BV candidate list (e.g., the IBC AMVP or merge candidate index is no smaller than maxIBCCandNum, or the decoded IBC AMVP index is no smaller than maxIBCAMVPNum, or the decoded IBC merge index is no smaller than maxIBCMrgNum), the block may be treated as an IBC block with invalid BV.
   a. In one example, the process applied to block with invalid BV may be applied to the block.
10. A supplemental BV candidate list may be constructed under certain conditions, such as the decoded IBC AMVP or IBC merge index is not smaller than maxIBCCandNum.
    a. In one example, the supplemental BV candidate list is constructed with one or multiple of the following steps (in order, or in an interleaved way):
       i. Adding HMVP candidates
          1) In ascending order of HMVP candidate index, starting from the K-th entry (e.g., K=0) in the HMVP table)
          2) In descending order of HMVP candidate index, starting from the K-th (e.g., K=0 or K=maxIBCCandNum−IBC AMVP/IBC Merge index or K=maxIBCCandNum−1−IBC AMVP/IBC Merge index) entry to the last in the HMVP table)
       ii. Virtual BV candidates derived from available candidates using the BV candidate list with maxIBCCandNum candidates.
          1) In one example, offsets may be added to horizontal and/or an offset to vertical component of a BV candidate to get a virtual BV candidate.
          2) In one example, offsets may be added to horizontal and/or an offset to vertical component of a HMVP candidate in the HMVP table to get a virtual BV candidate.
       iii. Adding default candidates
          1) In one example, (0, 0) may be added as a default candidate.
          2) In one example, default candidates may be derived according to current block's dimension.
11. maxIBCAMVPNum may be unequal to 2.
    a. Alternatively, furthermore, instead of signaling a flag (e.g., mvp_l0_flag) to indicate the motion vector predictor index, an index which may be larger than 1 may be signaled.
       i. In one example, the index may be binarized with unary/truncated unary/fixed length/exponential-golomb/other binarization method.
       ii. In one example, the bins of the binary bin string of the index may be context coded or bypass coded.
          1) In one example, the first K (e.g., K=1) bins of the binary bin string of the index may be context coded, and the remaining bins are bypass coded.
    b. In one example, maxIBCAMVPNum may be greater than maxIBCMrgNum.
       i. Alternatively, furthermore, the first maxIBCMrgNum BV candidates in the BV candidate list may be utilized for IBC merge coded blocks.

12. IBC BV candidate list may still be constructed even when maxIBCCandNum is set to 0 (e.g., MaxNumMergeCand=0).
    a. In one example, the merge list may be constructed as when IBC AMVP mode is enabled.
    b. In one example, the merge list may be constructed to contain up to maxIBCAMVPNum BV candidates when IBC merge mode is disabled.
13. For above disclosed methods, the term "maxIBCCandNum" may be replaced by "max(BCMrgNum" or "maxJBCAMVPNum".
14. For above disclosed methods, the term "maxIBCCandNum" and/or "maxIBCMrgNum" may be replaced by the MaxNumMergeCand which may represent the maximum number of merge candidate for regular merge list.

5 Embodiment

The newly added parts on top of JVET-N1001-v5 are enclosed within double bolded braces, i.e., {{a}} indicates that "a" has been added, and the deleted parts are enclosed within double bolded brackets, i.e., [[a]] indicates that "a" has been deleted.

5.1 Embodiment #1

Indication of maximum number of JIBC motion candidates (e.g., for JIBC AMVP and/or JIBC merge) may be signalled in slice header/PPS/APS/DPS.

7.3.5.1 General slice header syntax

| slice_header( ) { | Descriptor |
|---|---|
| slice_pic_parameter_set_id | ue(v) |
| if( rect_slice_flag \|\| NumBricksInPic > 1) | |
| slice_address | u(v) |
| if( !rect_slice_flag && !single_brick_per_slice_flag ) | |
| num_bricks_in_slice_minus1 | ue(v) |
| slice_type | ue(v) |
| if( NalUnitType = = GRA_NUT ) | |
| recovery_poc_cnt | se(v) |
| slice_pic_order_cnt_lsb | u(v) |
| if( NalUnitType = = IDR_W_RADL \|\| NalUnitType = IDR_N_LP \|\| NalUnitType = = CRA_NUT ) | |
| no_output_of_prior_pics_flag | u(1) |
| if( output_flag_present_flag ) | |
| pic_output_flag | u(1) |
| if( ( NalUnitType != IDR_W_RADL && NalUnitType != IDR_N_LP ) \| \| | |
| sps_idr_rpl_present_flag ) { | |
| ... | |
| } | |
| } | |
| if ( slice_type != I ) { | |
| if( sps_temporal_mvp_enabled_flag ) | |
| slice_temporal_mvp_enabled_flag | u(1) |
| if( slice_type = = B) | |
| mvd_l1_zero_flag | u(1) |
| if( cabac_init_present_flag ) | |
| cabac_init_flag | u(1) |
| if( slice_temporal_mvp_enabled_flag ) { | |
| if( slice_type = = B) | |
| collocated_from_l0_flag | u(1) |
| } | |
| if( ( weighted_pred_flag && slice_type = = P ) \|\| ( weighted_bipred_flag && slice_type = = B ) ) | |
| pred_weight_table( ) | |
| six_minus_max_num_merge_cand | ue(v) |
| if( sps_affine_enabled_flag ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_triangle_enabled_flag && MaxNumMergeCand >= 2) | |
| max_num_merge_cand_minus_max_num_triangle_cand | ue(v) |
| {{ if( sps_ibc_enabled_flag ) | |
| max_num_merge_cand_minus_max_num_IBC_cand | ue(v) }} |
| } else if ( sps_ibc_enabled_flag ) | |
| six_minus_max_num_merge_cand | ue(v) |
| slice_qp_delta | se(v) |
| ... | |
| } | |

{{max_num_merge_cand_minus_max_num_IBC_cand specifies the maximum number of IBC merge mode candidates supported in the slice subtracted from MaxNumMergeCand. The maximum number of IBC merge mode candidates, MaxNumIBCMergeCand is derived as follows:
MaxNumIBCMergeCand=MaxNumMergeCand−max_num_merge_cand_minus_max_num_IBC_cand
When max_num_merge_cand_minus_max_num_IBC_cand is present, the value of MaxNumIBCMergeCand shall be in the range of 2 (or 0) to MaxNumMergeCand, inclusive. When max_num_merge_cand_minus_max_num_IBC_cand is not present, MaxNumIBCMergeCand is set equal to 0. When MaxNumIBCMergeCand is equal to 0, IBC merge mode and IBC AMVP mode is not allowed for the current slice.}}

Alternatively, the signaling of indications of MaxNumIBCMergeCand may be replaced by:

| {{ if( sps_ibc_enabled_flag ) | |
|---|---|
|     five_minus_max_num_IBC_cand | ue(v) |
|     MaxNumIBCMergeCand = 5 − | |
|     five_minus_max_num_IBC_cand }} | |

5.2 Embodiment #2

It is proposed to change the maximum number of IBC BV list from the MaxNumMergeCand which controls both IBC and regular inter mode to a separate variable MaxNumIBCMergeCand. 8.6.2.2 Derivation process for IBC luma motion vector prediction This process is only invoked when CuPredMode[xCb][yCb] is equal to MODE_IBC, where (xCb, yCb) specify the top-left sample of the current luma coding block relative to the top-left luma sample of the current picture.

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
the luma motion vectors in 1/16 fractional-sample accuracy mvL.

The variables xSmr, ySmr, smrWidth, smrHeight, and smrNumHmvpIbcCand are derived as follows:

$xSmr = IsInSmr[xCb][yCb]?SmrX[xCb][yCb]:xCb$     (8-910)

$ySmr = IsInSmr[xCb][yCb]?SmrY[xCb][yCb]:yCb$     (8-911)

$smrWidth = IsInSmr[xCb][yCb]?SmrW[xCb][yCb]:cbWidth$     (8-912)

$smrHeight = IsInSmr[xCb][yCb]?SmrH[xCb][yCb]:cbHeight$     (8-913)

$smrNumHmvpIbcCandIsInSmr[xCb][yCb]?NumHmvpSmrIbcCand:NumHmvpIbcCand$     (8-914)

The luma motion vector mvL is derived by the following ordered steps:
1. The derivation process for spatial motion vector candidates from neighboring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlag$A_1$, availableFlag$B_1$ and the motion vectors mv$A_1$ and mv$B_1$.
2. The motion vector candidate list, mvCandList, is constructed as follows:

$i=0$ if(availableFlag$A_1$)

mvCandList[$i$++]=mv$A_1$     (8-915)

if(availableFlag$B_1$)

mvCandList[$i$++]=mv$B_1$

3. The variable numCurrCand is set equal to the number of merging candidates in the mvCandList.
4. When numCurrCand is less than [[MaxNumMergeCand]] {{MaxNumIBCMergeCand}} and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.
5. When numCurrCand is less than [[MaxNumMergeCand]] {{MaxNumIBCMergeCand}}, the following applies until numCurrCand is equal to MaxNumMergeCand:
   1. mvCandList[numCurrCand][0] is set equal to 0.
   2. mvCandList[numCurrCand][1] is set equal to 0.
   3. numCurrCand is increased by 1.
6. The variable mvIdx is derived as follows:

$mvIdx = general\_merge\_flag[xCb][yCb]?merge\_idx[xCb][yCb]:mvp\_l1\_flag[xCb][yCb]$     (8-916)

7. The following assignments are made:

$mvL[0] = mergeCandList[mvIdx][0]$     (8-917)

$mvL[1] = mergeCandList[mvIdx][1]$     (8-918)

In one example, MaxNumBCMergeCand is set to MaxNumMergeCand if current block is IBC merge mode; and set to 2 if current block is IBC AMVP mode.

In one example, MaxNumBCMergeCand is derived from the signaled information, such as using embodiment #1.

5.3 Embodiment #3

Conditional signaling of IBC related syntax elements according to the maximum allowed IBC candidate number. In one example, MaxNumIBCMergeCand is set equal to MaxNumMergeCand.

| coding_unit( x0, y0, cbWidth, cbHeight, treeType ) { | Descriptor |
|---|---|
|   if( slice_type !=I \|\| sps_ibc_enabled_flag) { | |
|     if( treeType !=DUAL_TREE_CHROMA && | |
|     !( cbWidth = = 4 && cbHeight = = 4 && !(sps_ibc_enabled_flag {{&& MaxNumIBCMergeCand>0)}}) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) \|\| | |
|     ( slice_type !=I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag {{&& MaxNumIBCMergeCand>0}}&& ( cbWidth !=128 \|\| | |

```
coding_unit( x0, y0, cbWidth, cbHeight, treeType ) {                                    Descriptor cbHeight != 128 ) )
            pred_mode_ibc_flag                                                          ae(v)
        }
    if( CuPredMode[ x0 ][ y0 ] = = MODE_INTRA ) {
    ...
    } else if( treeType != DUAL_TREE_CHROMA ) { /* MODE_INTER or MODE_IBC */
        if( cu_skip_flag[ x0 ][ y0 ] = = 0)
            general_merge_flag[ x0 ][ y0 ]                                              ae(v)
        if( general_merge_flag[ x0 ][ y0 ]) {
            merge_data( x0, y0, cbWidth, cbHeight )
        } else if ( CuPredMode[ x0 ][ y0 ] = = MODE_IBC ) {
    ...
    }
}
``` cu_skip_flag[x0][y0] equal to 1 specifies that for the current coding unit, when decoding a P or B slice, no more syntax elements except one or more of the following are parsed after cu_skip_flag[x0][y0]: the IBC mode flag pred_mode_ibc_flag [x0][y0] {{if MaxNumIBCMergeCand is larger than 0}}, and the merge_data( ) syntax structure; when decoding an I slice {{and MaxNumIBCMergeCand is larger than 0}}, no more syntax elements except merge_idx [x0][y0] are parsed after cu_skip_flag[x0][y0]. cu_skip_flag [x0][y0] equal to 0 specifies that the coding unit is not skipped. The array indices x0, y0 specify the location (x, y0) of the top-left luma sample of the considered coding block relative to the top-left luma sample of the picture.

When cu_skip_flag[x0][y0] is not present, it is inferred to be equal to 0.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:

If cu_skip_flag[x0][y0] is equal to 1, and cbWidth is equal to 4, and cbHeight is equal to 4, pred_mode_ibc_flag is inferred to be equal 1.

Otherwise, if both cbWidth and cbHeight are equal to 128, pred_mode_ibc_flag is inferred to be equal to 0.

Otherwise, pred_mode_ibc_flag is infered to be equal to the value of sps_ibc_enabled_flag when decoding an I slice {{and MaxNumIBCMergeCand is larger than 0}}, and 0 when decoding a P or B slice, respectively.

5.4 Embodiment #3

Conditional signaling of IBC related syntax elements according to the maximum allowed IBC candidate number.

```
Coding_unit( x0, y0, cbWidth, cbHeight, treeType ) {                                    Descriptor
    ...
    if( CuPredMode[ x0 ][ y0 ] = = MODE_INTRA ) {
    ...
    } else if( treeType != DUAL_TREE_CHROMA ) {/* MODE_INTER or MODE_IBC */
        if( cu_skip_flag[ x0 ][ y0 ] = = 0)
            general_merge_flag[ x0 ][ y0 ]                                              ae(v)
        if( general_merge_flag[ x0 ][ y0 ]) {
            merge_data( x0, y0, cbWidth, cbHeight)
        } else if ( CuPredMode[ x0 ][ y0 ] = = MODE_IBC ) {
{{      if( MaxNumIBCAMVPCand >0)    }}
            mvd_coding( x0, y0, 0, 0)
{{      if(MaxNumIBCAMVPCand >1)    }}
            mvp_l0_flag[ x0 ][ y0 ]                                                     ae(v)
            if( sps_amvr_enabled_flag && {{MaxNumIBCAMVPCand > 0 && }}
                ( MvdL0[ x0 ][ y0 ][ 0 ] != 0 | | MvdL0[ x0 ][ y0 ][ 1 ] != 0 ) ) {
                amvr_precision_flag[ x0 ][ y0 ]                                         ae(v)
            }
        ) else {
            if( slice_type = = B)
                inter_pred_idc[ x0 ][ y0 ]                                              ae(v)
            if( sps_affine_enabled_flag && cbWidth >=16 && cbHeight >=16) {
                inter_affine_flag[ x0 ][ y0 ]                                           ae(v)
                if( sps_affine_type_flag && inter_affine_flag[ x0 ][ y0 ])
                    cu_affine_type_flag[ x0 ][ y0 ]                                     ae(v)
            }
            ...
        }
    }
```

In one example, MaxNumIBCAMVPCand may be set to MaxNumIBCMergeCand or MaxNumMergeCand.

Figure 20A:
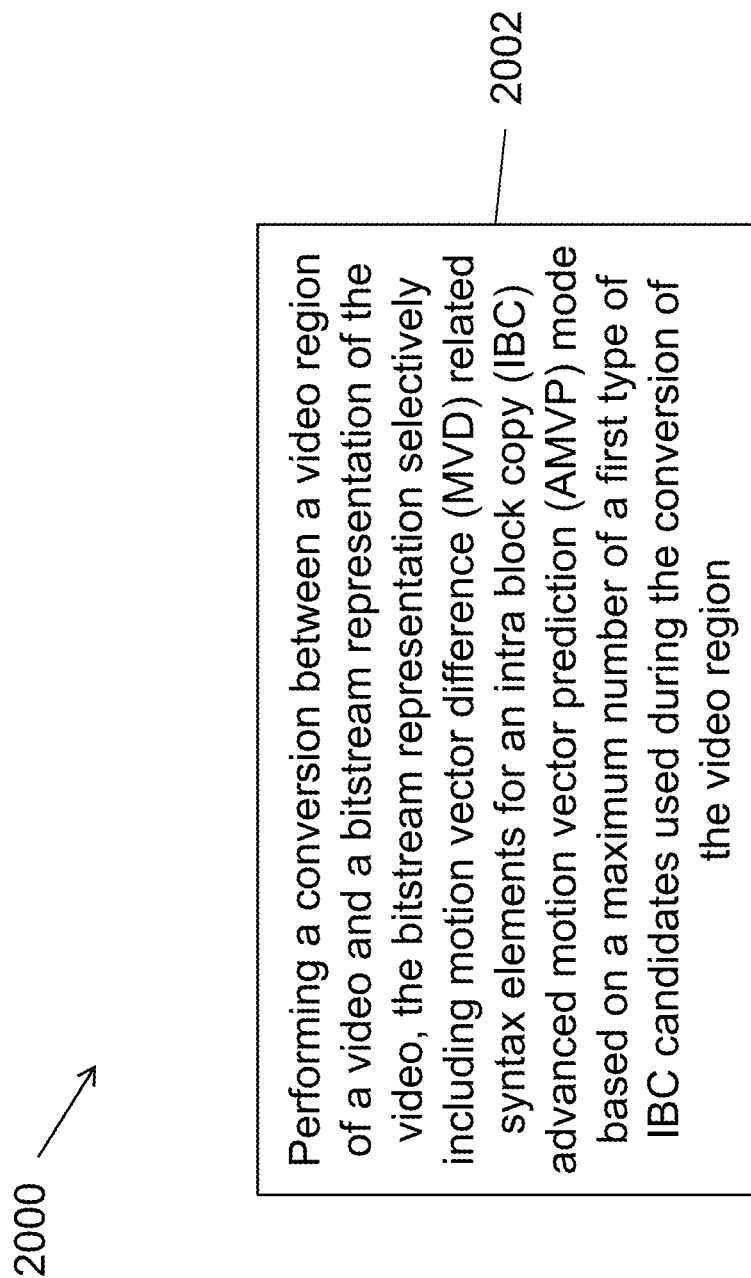
FIGS. 20A-20K are flowcharts for examples of methods for video processing.

FIG. 20A shows an example method 2000 for video processing. The method 2000 includes, at operation 2002, performing a conversion between a video region of a video and a bitstream representation of the video, the bitstream representation selectively including motion vector difference (MVD) related syntax elements for an intra block copy (IBC) advanced motion vector prediction (AMVP) mode based on a maximum number of a first type of IBC candidates used during the conversion of the video region. In some embodiments, when an IBC mode is applied, samples of the video region are predicted from other samples in a video picture corresponding to the video region.

Figure 20B:
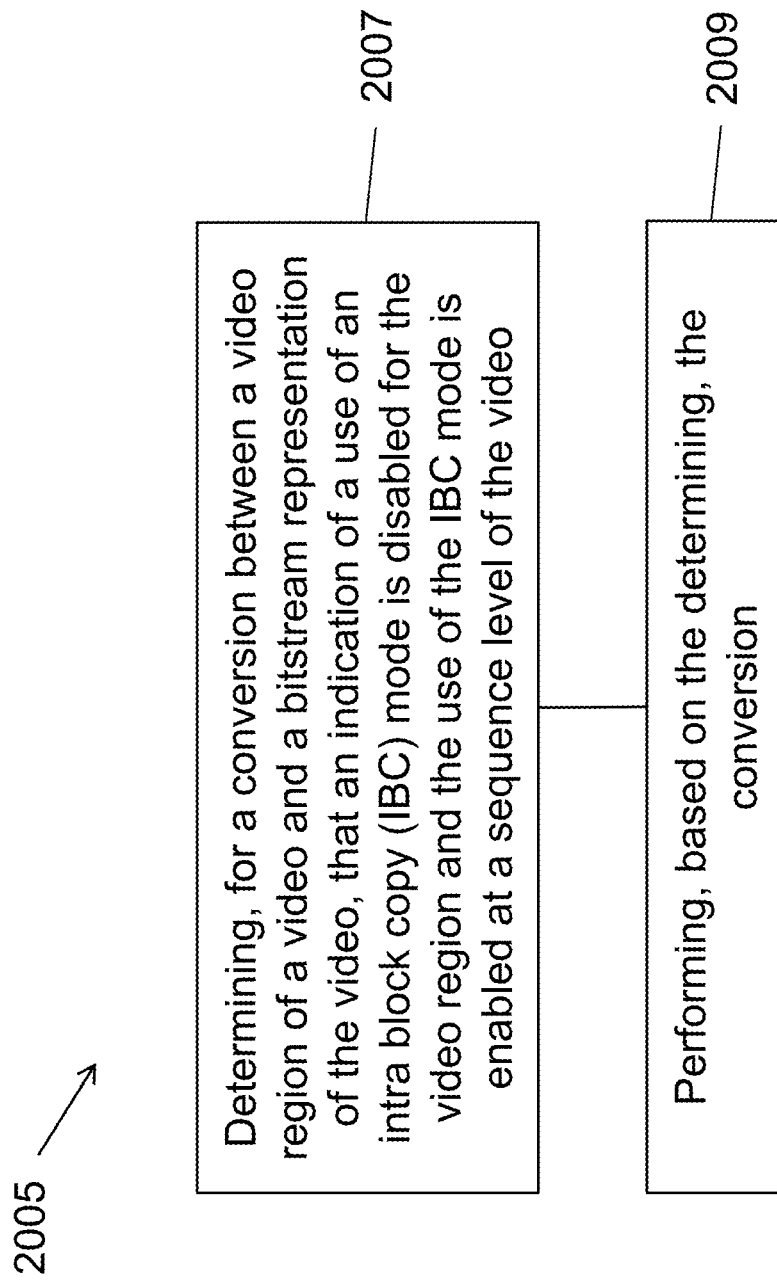

FIG. 20B shows an example method 2005 for video processing. The method 2005 includes, at operation 2007, determining, for a conversion between a video region of a video and a bitstream representation of the video, that an indication of a use of an intra block copy (IBC) mode is disabled for the video region and the use of the IBC mode is enabled at a sequence level of the video.

The method 2005 includes, at operation 2009, performing, based on the determining, the conversion. In some embodiments, when the IBC mode is applied, samples of the video region are predicted from other samples in a video picture corresponding to the video region.

Figure 20C:
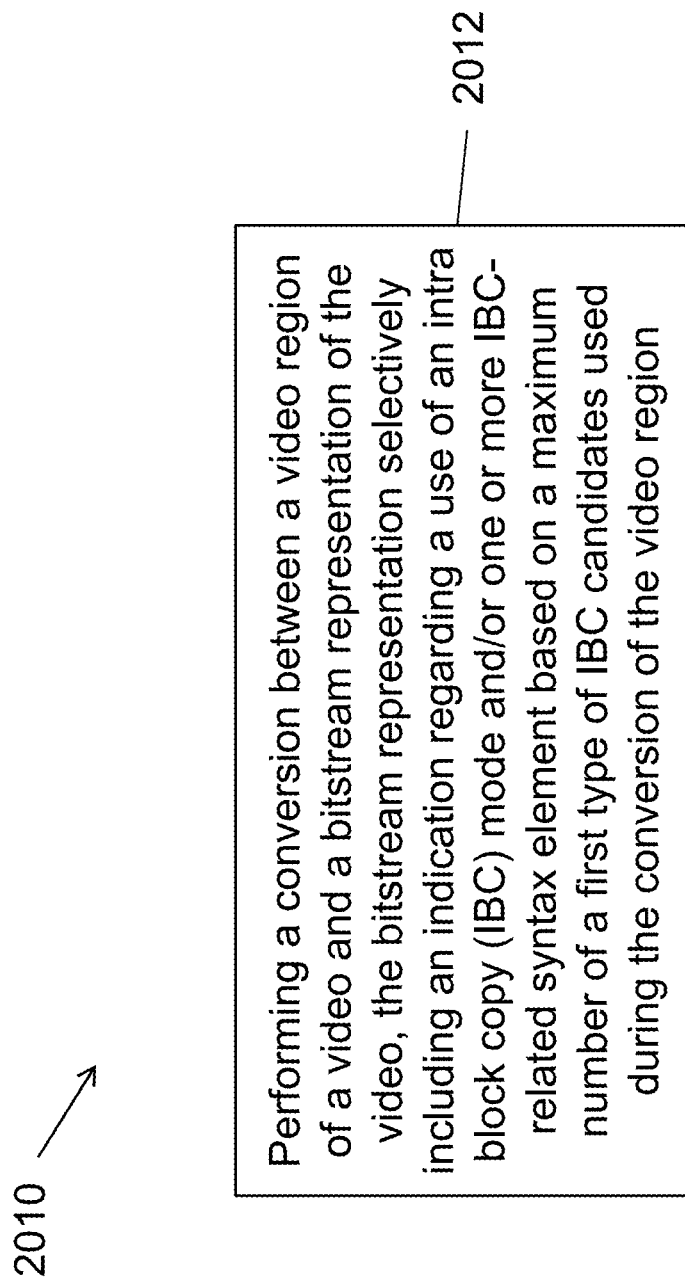

FIG. 20C shows an example method 2010 for video processing. The method 2010 includes, at operation 2012, performing a conversion between a video region of a video and a bitstream representation of the video, the bitstream representation selectively including an indication regarding a use of an intra block copy (IBC) mode and/or one or more IBC-related syntax element based on a maximum number of a first type of IBC candidates used during the conversion of the video region. In some embodiments, when the IBC mode is applied, samples of the video region are predicted from other samples in a video picture corresponding to the video region.

Figure 20D:
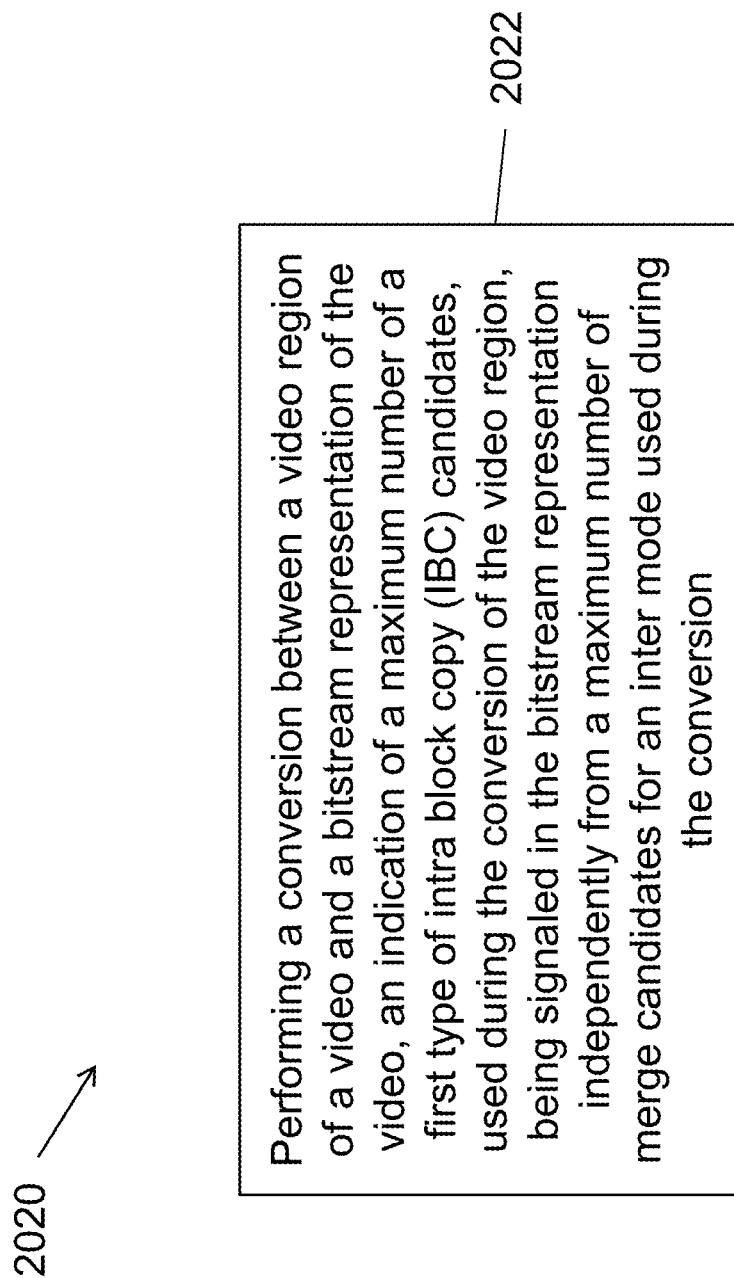

FIG. 20D shows an example method 2020 for video processing. The method 2020 includes, at operation 2022, performing a conversion between a video region of a video and a bitstream representation of the video, an indication of a maximum number of a first type of intra block copy (IBC) candidates, used during the conversion of the video region, being signaled in the bitstream representation independently from a maximum number of merge candidates for an inter mode used during the conversion. In some embodiments, when the IBC mode is applied, samples of the video region are predicted from other samples in a video picture corresponding to the video region.

Figure 20E:
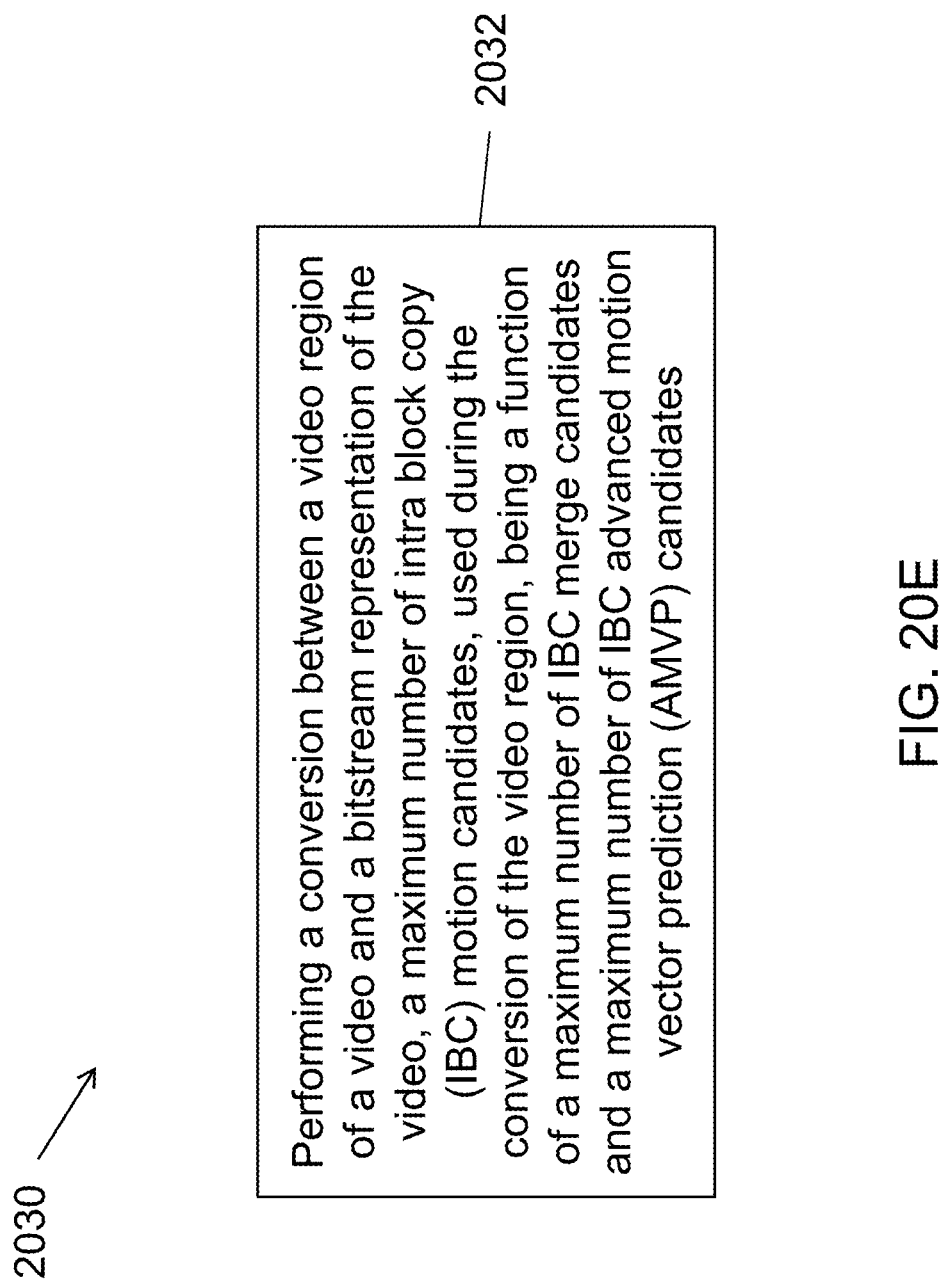

FIG. 20E shows an example method 2030 for video processing. The method 2030 includes, at operation 2032, performing a conversion between a video region of a video and a bitstream representation of the video, a maximum number of intra block copy (IBC) motion candidates, used during the conversion of the video region, being a function of a maximum number of IBC merge candidates and a maximum number of IBC advanced motion vector prediction (AMVP) candidates. In some embodiments, when the IBC mode is applied, samples of the video region are predicted from other samples in a video picture corresponding to the video region.

Figure 20F:
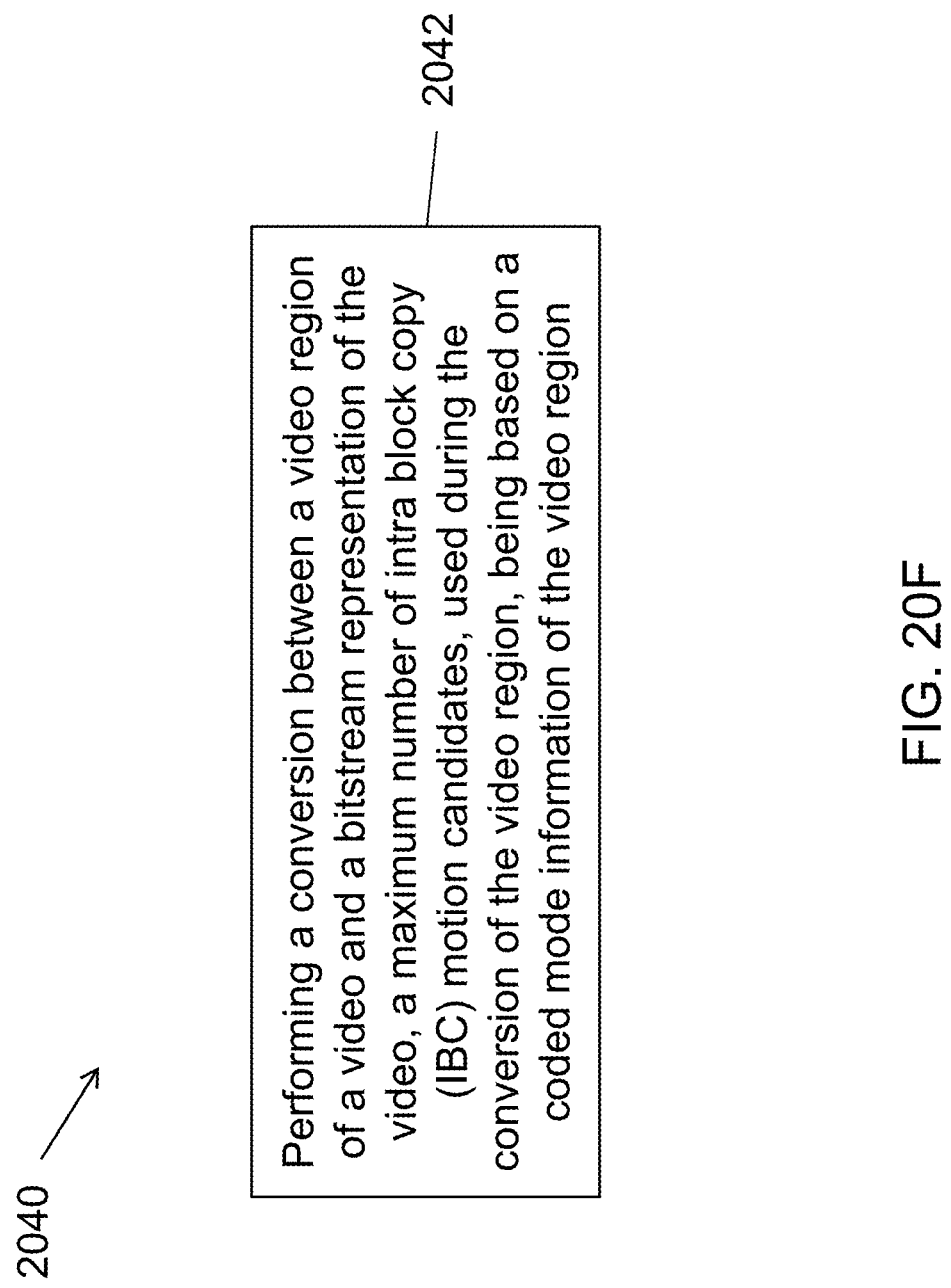

FIG. 20F shows an example method 2040 for video processing. The method 2040 includes, at operation 2042, performing a conversion between a video region of a video and a bitstream representation of the video, a maximum number of intra block copy (IBC) motion candidates, used during the conversion of the video region, being based on a coded mode information of the video region.

Figure 20G:
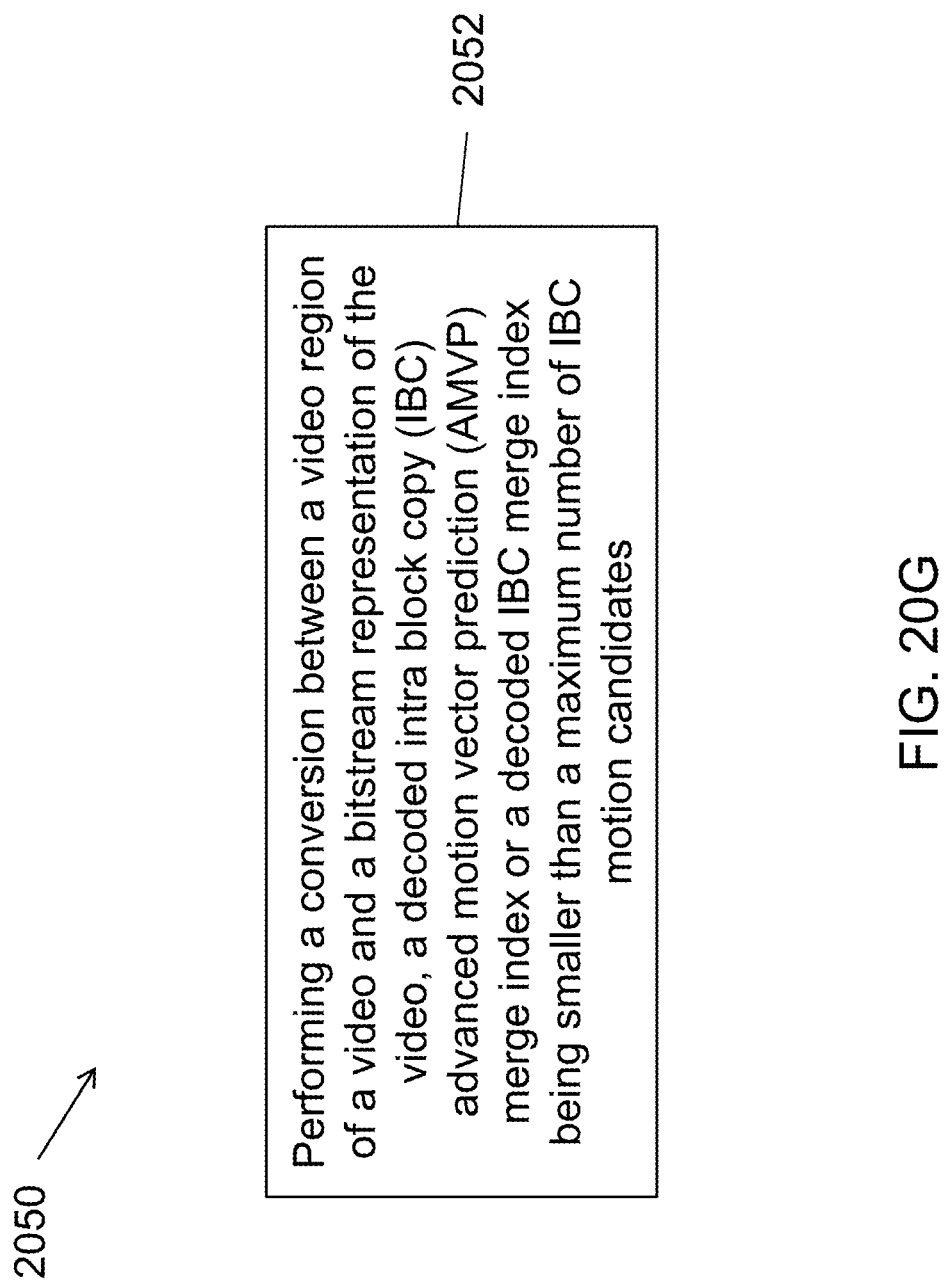

FIG. 20G shows an example method 2050 for video processing. The method 2050 includes, at operation 2052, performing a conversion between a video region of a video and a bitstream representation of the video, a decoded intra block copy (IBC) advanced motion vector prediction (AMVP) merge index or a decoded IBC merge index being smaller than a maximum number of intra block copy (IBC) motion candidates.

Figure 20H:
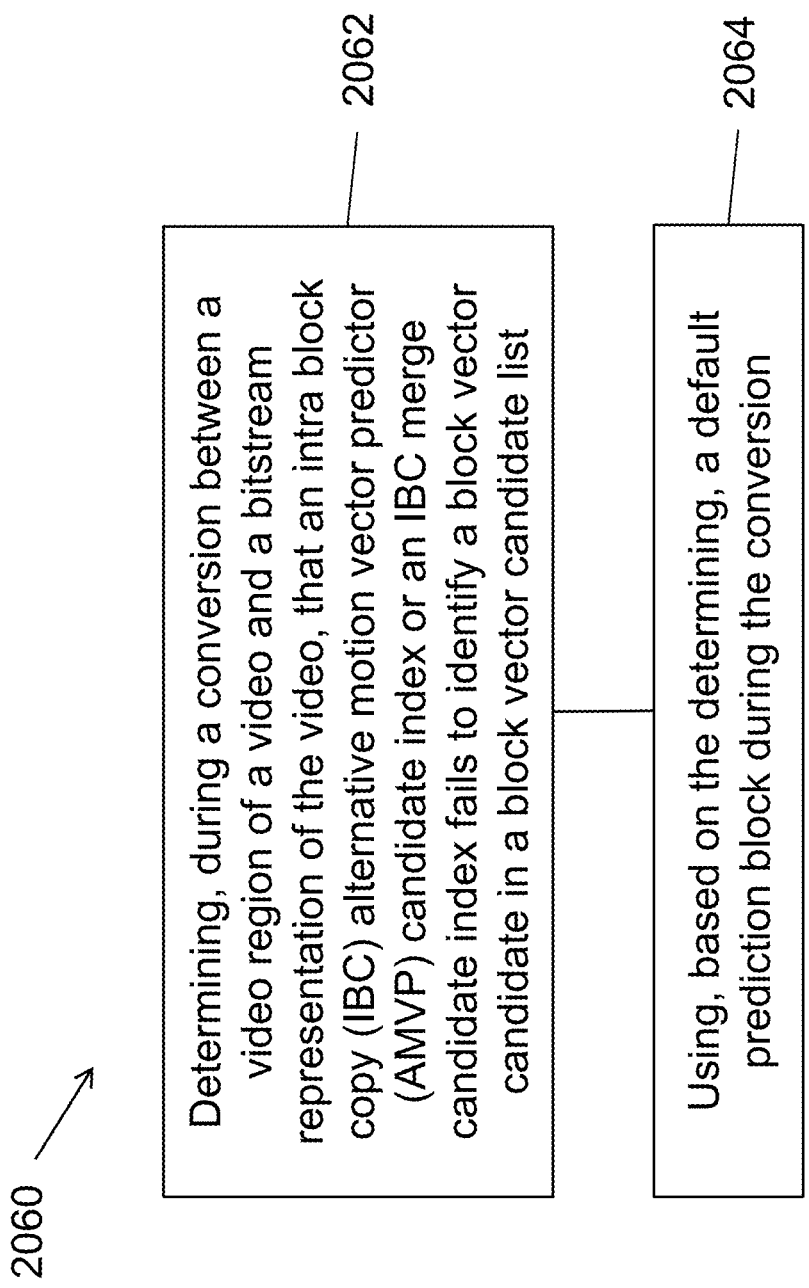

FIG. 20H shows an example method 2060 for video processing. The method 2060 includes, at operation 2062, determining, during a conversion between a video region of a video and a bitstream representation of the video, that an intra block copy (IBC) alternative motion vector predictor (AMVP) candidate index or an IBC merge candidate index fails to identify a block vector candidate in a block vector candidate list.

The method 2060 includes, at operation 2064, using, based on the determining, a default prediction block during the conversion.

Figure 20I:
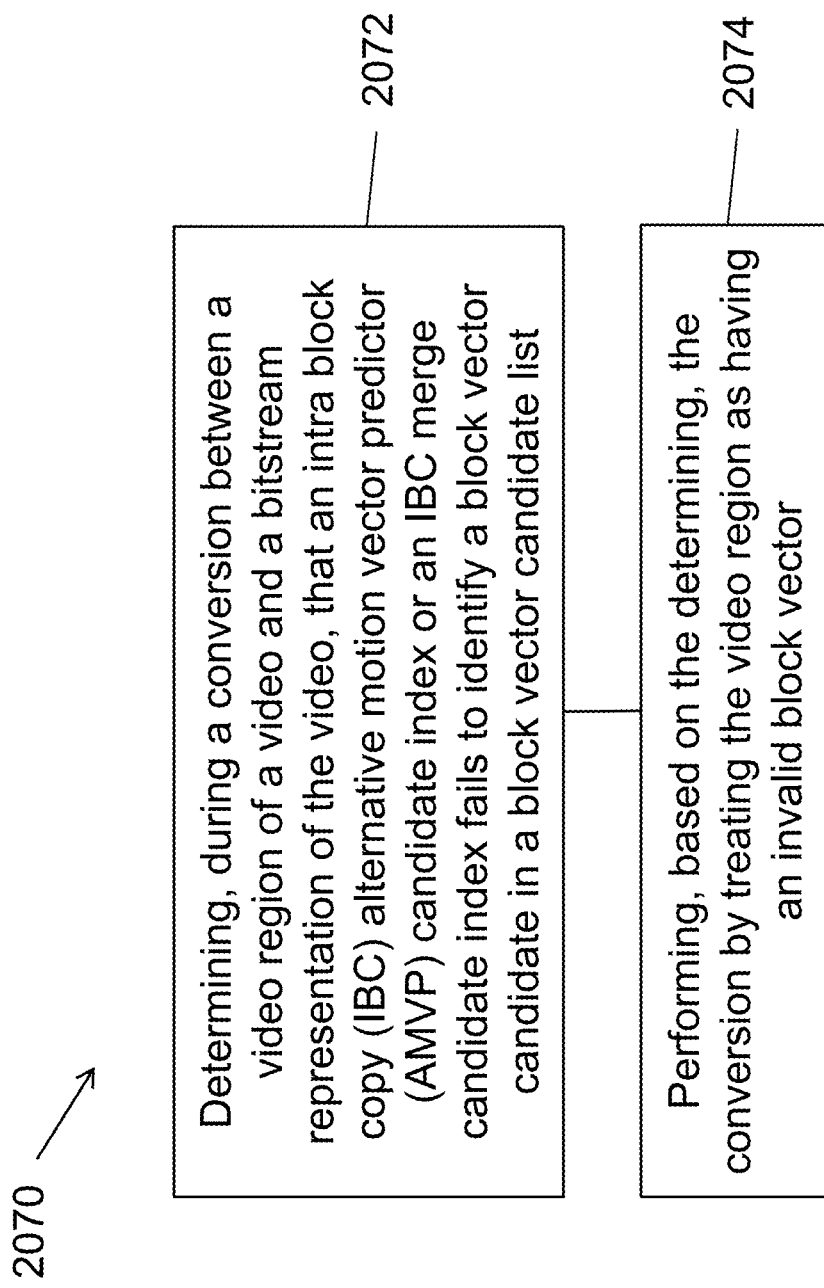

FIG. 20I shows an example method 2070 for video processing. The method 2070 includes, at operation 2072, determining, during a conversion between a video region of a video and a bitstream representation of the video, that an intra block copy (IBC) alternative motion vector predictor (AMVP) candidate index or an IBC merge candidate index fails to identify a block vector candidate in a block vector candidate list.

The method 2070 includes, at operation 2074, performing, based on the determining, the conversion by treating the video region as having an invalid block vector.

Figure 20J:
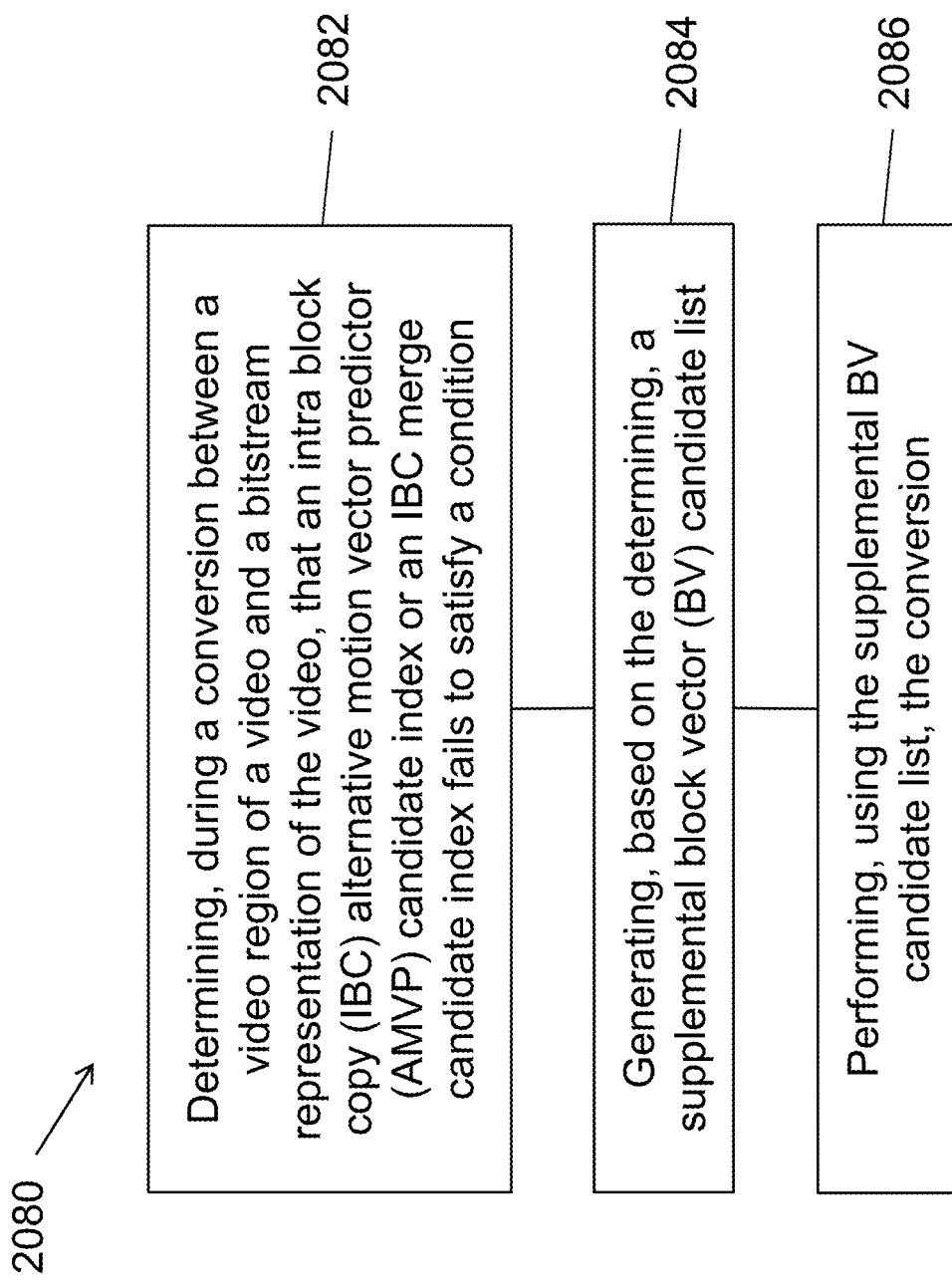

FIG. 20J shows an example method 2080 for video processing. The method 2080 includes, at operation 2082, determining, during a conversion between a video region of a video and a bitstream representation of the video, that an intra block copy (IBC) alternative motion vector predictor candidate index or an IBC merge candidate index fails to satisfy a condition.

The method 2080 includes, at operation 2084, generating, based on the determining, a supplemental block vector (BV) candidate list.

The method 2080 includes, at operation 2086, performing, using the supplemental BV candidate list, the conversion.

Figure 20K:
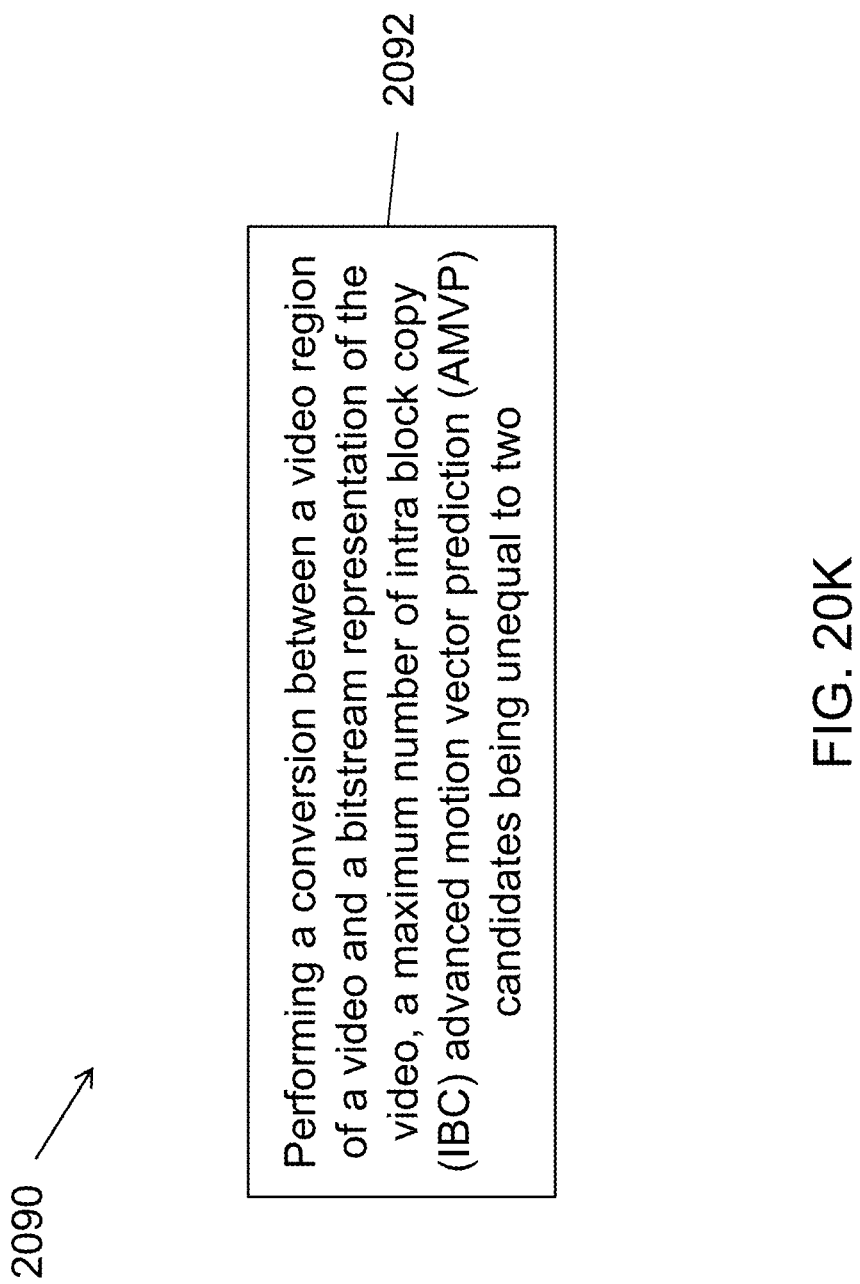

FIG. 20K shows an example method 2090 for video processing. The method 2090 includes, at operation 2092, performing a conversion between a video region of a video and a bitstream representation of the video, a maximum number of intra block copy (IBC) advanced motion vector prediction (AMVP) candidates being unequal to two.

Figure 21:
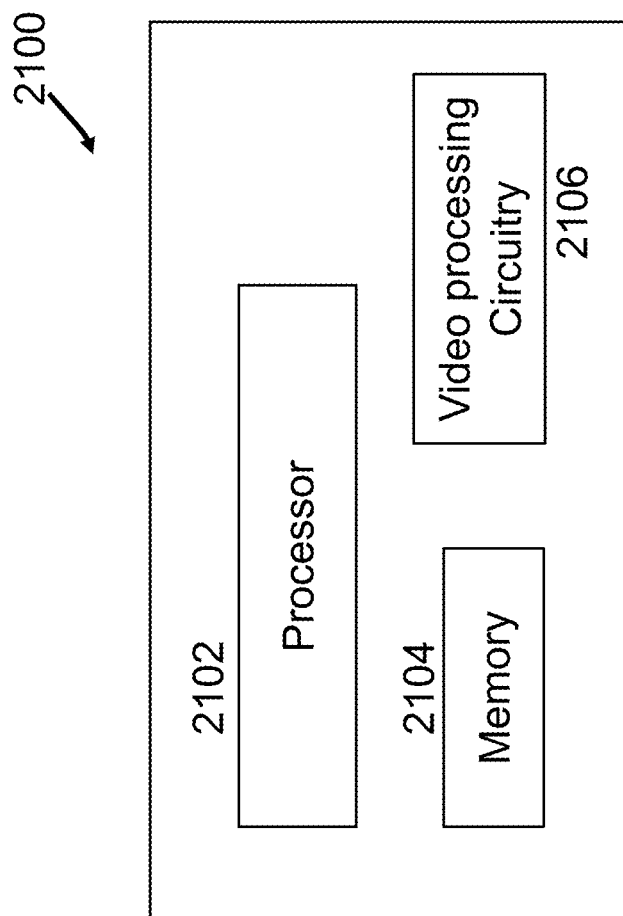
FIG. 21 is a block diagram of an example of a video processing apparatus.

FIG. 21 is a block diagram of a video processing apparatus 2100. The apparatus 2100 may be used to implement one or more of the methods described herein. The apparatus 2100 may be embodied in a smartphone, tablet, computer, Internet of Things (IoT) receiver, and so on. The apparatus 2100 may include one or more processors 2102, one or more memories 2104 and video processing hardware 2106. The processor(s) 2102 may be configured to implement one or more methods described in the present document. The memory (memories) 2104 may be used for storing data and code used for implementing the methods and techniques described herein. The video processing hardware 2106 may be used to implement, in hardware circuitry, some techniques described in the present document. The video processing hardware 2106 may be partially or completely includes within the processor(s) 2102 in the form of dedicated hardware, or graphical processor unit (GPU) or specialized signal processing blocks.

In some embodiments, the video coding methods may be implemented using an apparatus that is implemented on a hardware platform as described with respect to FIG. 21.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 22:
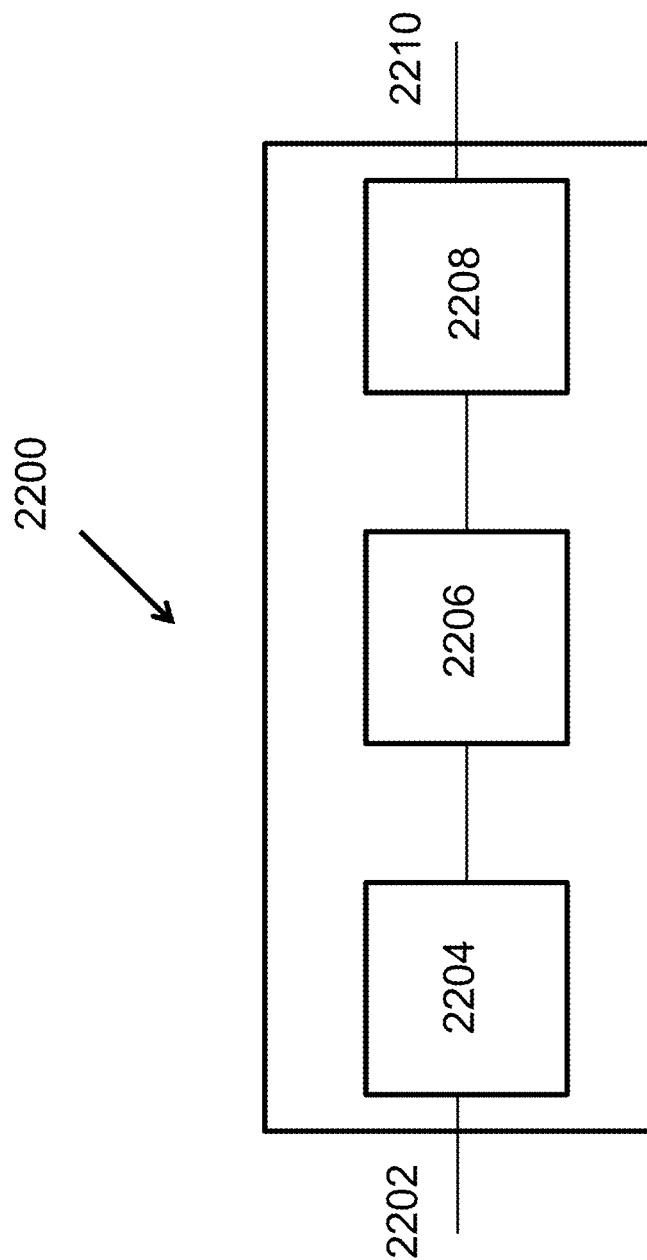
FIG. 22 is a block diagram of an example video processing system in which disclosed techniques may be implemented.

FIG. 22 is a block diagram showing an example video processing system 2200 in which various techniques disclosed herein may be implemented. Various implementations may include some or all of the components of the system 2200. The system 2200 may include input 2202 for receiving video content. The video content may be received in a raw or uncompressed format, e.g., 8 or 10 bit multi-component pixel values, or may be in a compressed or encoded format. The input 2202 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2200 may include a coding component 2204 that may implement the various coding or encoding methods described in the present document. The coding component 2204 may reduce the average bitrate of video from the input 2202 to the output of the coding component 2204 to produce a coded representation of the video. The coding techniques are therefore sometimes called video compression or video transcoding techniques. The output of the coding component 2204 may be either stored, or transmitted via a communication connected, as represented by the component 2206. The stored or communicated bitstream (or coded) representation of the video received at the input 2202 may be used by the component 2208 for generating pixel values or displayable video that is sent to a display interface 2210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the following technical solutions can be implemented:

A1. A method for video processing, comprising performing a conversion between a video region of a video and a bitstream representation of the video, wherein the bitstream representation selectively includes motion vector difference (MVD) related syntax elements for an intra block copy (IBC) advanced motion vector prediction (AMVP) mode based on a maximum number of a first type of IBC candidates used during the conversion of the video region, wherein, when an IBC mode is applied, samples of the video region are predicted from other samples in a video picture corresponding to the video region.

A2. The method of solution A1, wherein the MVD related syntax elements include at least one of a coded motion vector predictor index, a coded precision of a motion vector predictor, motion vector differences, and a coded precision of a motion vector difference of the IBC AMVP mode.

A3. The method of solution A1, wherein, based on the maximum number of the first type of IBC candidates being smaller than or equal to K, the bitstream representation excludes a signaling of the MDV related syntax elements for the IBC AMVP mode and the IBC AMVP mode is inferred to be disabled, and wherein K is an integer.

A4. The method of solution A1, wherein, based on the maximum number of the first type of IBC candidates being smaller than or equal to K, the bitstream representation excludes a signaling of motion vector differences and the IBC AMVP mode is inferred to be disabled, and wherein K is an integer.

A5. The method of solution A1, wherein, based on the maximum number of the first type of IBC candidates being greater than K, the bitstream representation selectively includes at least one of a coded motion vector predictor index, a coded precision of a motion vector predictor, and a coded precision of a motion vector difference of the IBC AMVP mode, and wherein K is an integer.

A6. The method of any of solutions A3 to A5, wherein K=0 or K=1.

A7. The method of solution A1, wherein, based on the maximum number of the first type of IBC candidates being equal to one, the bitstream representation excludes a motion vector predictor index for the IBC AMVP mode.

A8. The method of solution A19, wherein the motion vector predictor index for the IBC AMVP mode is inferred to be zero.

A9. The method of solution A1, wherein, based on the maximum number of the first type of IBC candidates being equal to zero, the bitstream representation excludes a precision of a motion vector predictor and/or a precision of a motion vector difference of the IBC AMVP mode.

A10. The method of solution A1, wherein, based on the maximum number of the first type of IBC candidates being greater than zero, the bitstream representation excludes a precision of a motion vector predictor and/or a precision of a motion vector difference of the IBC AMVP mode.

A11. The method of any of solutions A1 to A10, wherein the maximum number of the first type of IBC candidates is a maximum number of IBC motion candidates (denoted maxIBCCandNum).

A12. The method of any of solutions A1 to A10, wherein the maximum number of the first type of IBC candidates is a maximum number of IBC merge candidates (denoted maxIBCMrgNum).

A13. The method of any of solutions A1 to A10, wherein the maximum number of the first type of IBC candidates is a maximum number of IBC advanced motion vector prediction (AMVP) candidates (denoted maxIBCAMVPNum).

A14. The method of any of solutions A1 to A10, wherein the maximum number of the first type of IBC candidates is signaled in the bitstream representation.

A15. A method for video processing, comprising determining, for a conversion between a video region of a video and a bitstream representation of the video, that an indication of a use of an intra block copy (IBC) mode is disabled for the video region and the use of the IBC mode is enabled at a sequence level of the video; and performing, based on the determining, the conversion, wherein, when the IBC mode is applied, samples of the video region are predicted from other samples in a video picture corresponding to the video region.

A16. The method of solution A15, wherein the video region corresponds to a picture, a slice, a tile, a tile group, or a brick of the video picture.

A17. The method of solution A15 or A16, wherein the bitstream representation comprises the indication associated with the determining.

A18. The method of solution A17, wherein the indication is signaled in a picture, a slice, a tile, a brick, or an adaptation parameter set (APS).

A19. The method of solution A18, wherein the indication is signaled in a picture parameter set (PPS), a slice header, a picture header, a tile header, a tile group header, or a brick header.

A20. The method of solution A15, wherein the IBC mode is disabled based on a video content of the video being different from screen content.

A21. The method of solution A15, wherein the IBC mode is disabled based on a video content of the video is camera-captured content.

A22. A method for video processing, comprising performing a conversion between a video region of a video and a bitstream representation of the video, wherein the bitstream representation selectively includes an indication regarding a use of an intra block copy (IBC) mode and/or one or more IBC-related syntax element based on a maximum number of a first type of IBC candidates used during the conversion of the video region, wherein, when the IBC mode is applied, samples of the video region are predicted from other samples in a video picture corresponding to the video region.

A23. The method of solution A22, wherein the maximum number of the first type of IBC candidates is set equal to a maximum number of merge candidates for inter coded blocks.

A24. The method of solution A22, wherein, based on the maximum number of the first type of IBC candidates being equal to zero, the bitstream representation excludes a signaling of an IBC skip mode and the IBC skip mode is inferred to be disabled.

A25. The method of solution A22, wherein, based on the maximum number of the first type of IBC candidates being equal to zero, the bitstream representation excludes a signaling of an IBC merge mode or an IBC advanced motion vector prediction (AMVP) mode and the IBC mode is inferred to be disabled.

A26. The method of solution A22, wherein, based on the maximum number of the first type of IBC candidates being equal to zero, the bitstream representation excludes a signaling of a merge mode and an IBC merge mode is inferred to be disabled.

A27. The method of any of solutions A22 to A26, wherein the maximum number of the first type of IBC candidates is a maximum number of IBC motion candidates (denoted maxIBCCandNum), a maximum number of IBC merge candidates (denoted maxIBCMrgNum), or a maximum number of IBC advanced motion vector prediction (AMVP) candidates (denoted maxIBCAMVPNum).

A28. The method of any of solutions A22 to A26, wherein the maximum number of the first type of IBC candidates is signaled in the bitstream representation.

A29. The method of any of solutions A1 to A28, wherein the conversion comprises generating pixel values of the video region from the bitstream representation.

A30. The method of any of solutions A1 to A28, wherein the conversion comprises generating the bitstream representation from pixel values of the video region.

A31. A video processing apparatus comprising a processor configured to implement a method recited in any one or more of solutions A1 to A30.

A32. A computer readable medium storing program code that, when executed, causes a processor to implement a method recited in any one or more of solutions A1 to A30.

In some embodiments, the following technical solutions can be implemented:

B1. A method for video processing, comprising performing a conversion between a video region of a video and a bitstream representation of the video, wherein an indication of a maximum number of a first type of intra block copy (IBC) candidates, used during the conversion of the video region, is signaled in the bitstream representation independently from a maximum number of merge candidates for an inter mode used during the conversion, wherein, when the IBC mode is applied, samples of the video region are predicted from other samples in a video picture corresponding to the video region.

B2. The method of solution B1, wherein the maximum number of the first type of IBC candidates is directly signaled in the bitstream representation.

B3. The method of solution B1, wherein the maximum number of the first type of IBC candidates is greater than zero due to the IBC mode being enabled for the conversion of the video region.

B4. The method of any of solutions B1 to B3, further comprising predictively coding the maximum number of the first type of IBC candidates (denoted maxNumIBC) using another value.

B5. The method of solution B4, wherein the indication of the maximum number of the first type of IBC candidates is set to a difference after the predictively coding.

B6. The method of solution B5, wherein the difference is between the another value and the maximum number of the first type of IBC candidates.

B7. The method of solution B6, wherein the another value is a size (S) of a regular merge list, wherein (S-maxNumIBC) is signaled in the bitstream, and wherein S is an integer.

B8. The method of solution B6, wherein the another value is a fixed integer (K), and wherein (K-maxNumIBC) is signaled in the bitstream.

B9. The method of solution B8, wherein K=5 or K=6.

B10. The method of any of solutions B6 to B9, wherein the maximum number of the first type of IBC candidates is derived to be (K−the indication of the maximum number signaled in the bitstream).

B11. The method of solution B5, wherein the difference is between the maximum number of the first type of IBC candidates and the another value.

B12. The method of solution B11, wherein the another value is a fixed integer (K), and wherein (maxNumIBC-K) is signaled in the bitstream.

B13. The method of solution B12, wherein K=0 or K=2.

B14. The method of solution B11 to B13, wherein the maximum number of the first type of IBC candidates is derived to be (the indication of the maximum number signaled in the bitstream+K).

B15. The method of any of solutions B1 to B14, wherein the maximum number of the first type of IBC candidates is a maximum number of IBC motion candidates (denoted maxIBCCandNum).

B16. The method of any of solutions B1 to B14, wherein the maximum number of the first type of IBC candidates is a maximum number of IBC merge candidates (denoted maxIBCMrgNum).

B17. The method of any of solutions B1 to B14, wherein the maximum number of the first type of IBC candidates is a maximum number of IBC advanced motion vector prediction (AMVP) candidates (denoted maxIBCAMVPNum).

B18. A method for video processing, comprising performing a conversion between a video region of a video and a bitstream representation of the video, wherein a maximum number of intra block copy (IBC) motion candidates (denoted maxIBCCandNum), used during the conversion of the video region, is a function of a maximum number of IBC merge candidates (denoted maxIBCMrgNum) and a maximum number of IBC advanced motion vector prediction (AMVP) candidates (denoted maxIBCAMVPNum), wherein, when the IBC mode is applied, samples of the video region are predicted from other samples in a video picture corresponding to the video region.

B19. The method of solution B18, wherein maxIBCAMVPNum is equal to 2.

B20. The method of solution B18 or B19, where the function returns a larger of its arguments.

B21. A method for video processing, comprising performing a conversion between a video region of a video and a bitstream representation of the video, wherein a maximum number of intra block copy (IBC) motion candidates (denoted maxIBCCandNum), used during the conversion of the video region, is based on a coded mode information of the video region.

B22. The method of solution B21, wherein maxIBCCandNum is set to a maximum number of IBC merge candidate (denoted maxIBCMrgNum) based on the video region being coded with an IBC merge mode.

B23. The method of solution B21, wherein maxIBCCandNum is set to a maximum number of IBC advanced motion vector prediction (AMVP) candidates (denoted maxIBCAMVPNum) based on the video region being coded with an IBC AMVP mode.

B24. A method for video processing, comprising performing a conversion between a video region of a video and a bitstream representation of the video, wherein a decoded intra block copy (IBC) advanced motion vector prediction (AMVP) merge index or a decoded IBC merge index is smaller than a maximum number of IBC motion candidates (denoted maxIBCCandNum).

B25. The method of solution B24, wherein the decoded IBC AMVP merge index is smaller than a maximum number of IBC AMVP candidates (denoted maxIBCAMVPNum).

B26. The method of solution B24, wherein the decoded IBC merge index is smaller than a maximum number of IBC merge candidates (denoted maxIBCMrgNum).

B27. The method of solution B26, wherein maxIBCMrgNum=2.

B28. A method for video processing, comprising determining, during a conversion between a video region of a video and a bitstream representation of the video, that an intra block copy (IBC) alternative motion vector predictor (AMVP) candidate index or an IBC merge candidate index fails to identify a block vector candidate in a block vector candidate list; and using, based on the determining, a default prediction block during the conversion.

B29. The method of solution B28, wherein each sample of the default prediction block is set to $(1<<(BitDepth-1))$, wherein BitDepth is a positive integer.

B30. The method of solution B28, wherein a default block vector is assigned to the default prediction block.

B31. A method for video processing, comprising determining, during a conversion between a video region of a video and a bitstream representation of the video, that an intra block copy (IBC) alternative motion vector predictor (AMVP) candidate index or an IBC merge candidate index fails to identify a block vector candidate in a block vector candidate list; and performing, based on the determining, the conversion by treating the video region as having an invalid block vector.

B32. A method for video processing, comprising determining, during a conversion between a video region of a video and a bitstream representation of the video, that an intra block copy (IBC) alternative motion vector predictor (AMVP) candidate index or an IBC merge candidate index fails to satisfy a condition; generating, based on the determining, a supplemental block vector (BV) candidate list; and performing, using the supplemental BV candidate list, the conversion.

B33. The method of solution B32, wherein the condition comprises the IBC AMVP candidate index or the IBC merge candidate index no smaller than a maximum number of IBC motion candidates for the video region.

B34. The method of solution B32 or B33, wherein the supplemental BV candidate vector list is generated using following steps: adding one or more history-based motion vector prediction (HMVP) candidates, generating one or more virtual BV candidates from other BV candidates; and adding one or more default candidates.

B35. The method of solution B34, wherein the steps are performed in sequence.

B36. The method of solution B34, wherein the steps are performed in an interleaved manner.

B37. A method for video processing, comprising performing a conversion between a video region of a video and a bitstream representation of the video, wherein a maximum number of intra block copy (IBC) advanced motion vector prediction (AMVP) candidates (denoted maxIBCAMVPNum) is unequal to two.

B38. The method of solution B37, wherein the bitstream representation excludes a flag indicative of a motion vector predictor index and includes an index having a value greater than one.

B39. The method of solution B38, wherein the index is binary coded using a unary, a truncated unary, a fixed length, or an exponential-Golomb representation.

B40. The method of solution B38, wherein bins of a binary bin string of the index are context coded or bypass coded.

B41. The method of solution B37, wherein maxIB-CAMVPNum is greater than a maximum number of IBC merge candidates (denoted maxIBCMrgNum).

B42. A method of video processing, comprising determining, during a conversion between a video region and a bitstream representation of the video region, that a maximum number of intra block copy (IBC) motion candidates is zero, and performing, based on the determining, the conversion by generating an IBC block vector candidate list during the conversion.

B43. The method of solution B42, wherein the conversion further includes generating a merge list based on an IBC advanced motion vector prediction (AMVP) mode being enabled for the conversion of the video region.

B44. The method of solution B42, wherein the conversion further includes generating a merge list having a length up to a maximum number of IBC AMVP candidates based on an IBC merge mode being disabled for the conversion of the video region.

B45. The method of any of solutions B1 to B44, wherein the conversion comprises generating pixel values of the video region from the bitstream representation.

B46. The method of any of solutions B1 to B44, wherein the conversion comprises generating the bitstream representation from pixel values of the video region.

B47. A video processing apparatus comprising a processor configured to implement a method recited in any one or more of solutions B1 to B46.

B48. A computer readable medium storing program code that, when executed, causes a processor to implement a method recited in any one or more of solutions B1 to B46.

In some embodiments, the following technical solutions can be implemented:

C1. A video processing method, comprising determining, during a conversion between a video region of a video and a bitstream representation of the video region that use of an intra block copy mode is disabled for the video region and use of the intra block copy mode is enabled for other video regions of the video; and performing the conversion based on the determining; wherein, in the intra block copy mode, pixels of the video region are predicted from other pixels in a video picture corresponding to the video region.

C2. The method of solution C1, wherein the video region corresponds to the video picture or a slice or a tile or a tile group or a brick of the video picture.

C3. The method of any of solutions C1-C2, wherein the bitstream representation includes an indication regarding the determining.

C4. The method of solution C3, wherein the indication is included at a picture or a slice or a tile or a tile group or a brick level.

C5. A video processing method, comprising performing a conversion between a video region of a video and a bitstream representation of the video, wherein the bitstream representation selectively includes an indication regarding the determining in a case that a maximum number of IBC motion candidates used during the conversion of the video region, indicates as maxIBCCandNum, is equal to a maximum number of merge candidates, indicated as MaxNumMergeCand, used during the conversion.

C6. The method of solution C5, wherein maxIBCCandNum is equal to zero, and due to the maxIBCCCardNum being equal to zero the bitstream representation excludes signaling of certain IBC information.

C7. A method of video processing, comprising performing a conversion between a video region of a video and a bitstream representation of the video, wherein the bitstream representation includes motion vector difference related syntax elements for an intra block copy alternative motion vector predictor depending on a value of a maximum number of intra block copy motion candidates, indicates as maxIBCCandNum, used during the conversion of the video region, satisfying a condition; wherein, in the intra block copy mode, pixels of the video region are predicted from other pixels in a video picture corresponding to the video region.

C8. The method of solution C7, wherein the condition comprises maxIBCCandNum being equal to a maximum number of merge candidates, indicated as MaxNumMergeCand, used during the conversion.

C9. The method of solution C8, wherein maxIBCCandNum is equal to 0, and due to the maxIBCCandNum being equal to 0, signaling of a motion vector predictor index for the intra block copy alternative motion vector predictor is omitted from the bitstream representation.

C10. The method of solution C8, wherein maxIBCCandNum is equal to 0, and due to the maxIBCCandNum being equal to 0, signaling of motion vector differences for the intra block copy alternative motion vector predictor is omitted from the bitstream representation.

C11. A method of video processing, comprising performing a conversion between a video region of a video and a bitstream representation of the video, wherein a maximum number of intra block copy motion candidates, indicates as maxIBCCandNum, used during the conversion of the video region, is signaled in the bitstream representation independently from a maximum number of merge candidates, indicated as MaxNumMergeCand, used during the conversion; wherein intra block copy corresponds to a mode in which pixels of the video region are predicted from other pixels in a video picture corresponding to the video region.

C12. The method of solution C11, wherein MaxIBCCandNum is greater than zero due to intra block copy being enabled for the conversion of the video region.

C13. The method of any of solutions C11-C12, wherein maxIBCCandNum is signaled in the bitstream representation by predictively coding using another value.

C14. The method of solution C13, wherein the another value is MaxNumMergeCand.

C15. The method of solution C13, wherein the another value is a constant K.

C16. A method of video processing, comprising performing a conversion between a video region of a video and a bitstream representation of the video, wherein a maximum number of intra block copy (IBC) motion candidates, indicates as maxIBCCandNum, used during the conversion of the video region, is dependent on a coded mode information of the video region; wherein IBC corresponds to a mode in which pixels of the video region are predicted from other pixels in a video picture corresponding to the video region.

C17. The method of solution C16, when the block is coded with IBC merge mode, maxIBCCandNum is set to the maximum number of IBC merge candidate, denoted as maxIBCMrgNum.

C18. The method of solution C16, when the block is coded with IBC alternative motion vector prediction candidate (AMVP) mode, maxIBCCandNum is set to the maximum number of IBC AMVP number, denoted as maxIBCAMVPNum.

C19. The method of solution C17, maxIBCMrgNum is signaled in the slice header.

C20. The method of solution C17, maxIBCMrgNum is set to be the same as the maximum number of allowed non-IBC translational merge candidates.

C21. The method of solution C18, maxIBCAMVPNum is set to 2.

C22. A method of video processing, comprising performing a conversion between a video region of a video and a bitstream representation of the video, wherein a maximum number of intra block copy (IBC) motion candidates, indicates as maxIBCCandNum, used during the conversion of the video region, is a first function of a maximum number of IBC merge candidate, denoted as maxIBCMrgNum, and a maximum number of IBC alternative motion vector prediction candidate number, denoted as maxIBCAMVPNum; wherein IBC corresponds to a mode in which pixels of the video region are predicted from other pixels in a video picture corresponding to the video region.

C23. The method of solution C22, wherein maxIBCAMVPNum is equal to 2.

C24. The method of solution C22-C23, wherein, during the conversion, a decoded IBC alternative motion vecot predictor index is smaller than maxIBCAMVPNum.

C25. A method of video processing, comprising determining, during a conversion between a video region of a video and a bitstream representation of the video, that an intra block copy alternative motion vector predictor index or an intra block copy merge candidate index fails to identify a block vector candidate in a block vector candidate list; and using a default prediction block during the conversion based on the determining.

C26. A method of video processing, comprising determining, during a conversion between a video region of a video and a bitstream representation of the video, that an intra block copy alternative motion vector predictor index or an intra block copy merge candidate index fails to identify a block vector candidate in a block vector candidate list; and performing conversion based on the determining by treating the video region as having an invalid block vector.

C27. A method of video processing, comprising determining, during a conversion between a video region of a video and a bitstream representation of the video, that an intra block copy alternative motion vector predictor index or an intra block copy merge candidate index fails to satisfy a condition; and generating, based on the determining, a supplemental block vector (BV) candidate list; and performing the conversion using the supplemental block vector candidate list.

C28. The method of solution C27, wherein the condition includes the intra block copy alternative motion vector predictor index or the intra block copy merge candidate index being less than maximum number of intra block copy candidates for the video region.

C29. The method of any of solutions C27-C28, wherein the supplemental BV candidate vector list is generated using following steps: generating history based motion vector predictor candidates, generating virtual BV candidate from other BV candidates; and adding default candidates.

C30. The method of solution C29, wherein the steps are performed in sequence.

C31. The method of solution C29, wherein the steps are performed in an interleaved manner.

C32. A method of video processing, comprising performing a conversion between a video region of a video and a bitstream representation of the video, wherein a maximum number of IBC alternative motion vector prediction candidate number, denoted as maxIBCAMVPNum, is unequal to 2; wherein IBC corresponds to a mode in which pixels of the video region are predicted from other pixels in a video picture corresponding to the video region.

C33. The method of solution C32, wherein the bitstream representation excludes a first flag indicative of a motion vector predictor index and includes an index having a value greater than one.

C34. The method of any of solutions C32-C33, wherein the index is coded using a binarized with unary/truncated unary/fixed length/exponential-golomb/other binarization representation.

C35. A method of video processing, comprising determining, during a conversion between a video region and a bitstream representation of the video region, that a maximum number of intra block copy (IBC) candidates is zero, and performing, based on the determining, the conversion by generating an IBC block vector candidate list during the conversion; wherein IBC corresponds to a mode in which pixels of the video region are predicted from other pixels in a video picture corresponding to the video region.

C36. The method of solution C35, wherein the conversion further includes generating a merge list by assuming that IBC alternative motion vector predictor mode is enabled for the conversion of the video region.

C37. The method of solution C34, wherein the conversion further includes generating a merge list having a length having up to a maximum number of IBC advanced motion vector predictor candidates in case that IBC merge mode is disabled for the conversion of the video region.

C38. The method recited in any of solutions C1-C37, wherein the conversion comprises generating pixel values of the video region from the bitstream representation.

C39. The method recited in any of solutions C1-C37, wherein the conversion comprises generating the bitstream representation from pixel values of the video region.

C40. A video processing apparatus comprising a processor configured to implement a method recited in any one or more of solutions C1 to C39.

C41. A computer readable medium storing program code that, when executed, causes a processor to implement a method recited in any one or more of solutions C1 to C39.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
performing a conversion between a video region of a video and a bitstream of the video,
wherein whether a merge mode is applied is determined,
wherein whether an intra block copy (IBC) motion vector prediction mode is applied is determined,
wherein, when the IBC motion vector prediction mode is applied and the merge mode is not applied, whether to include at least one syntax element for the IBC motion vector prediction mode in the bitstream is based on a maximum number of IBC candidates used during the conversion of the video region,
wherein the at least one syntax element includes a motion vector predictor index of list 0,
wherein list 0 is a reference picture list of the video region with a reference picture list index of 0,
wherein, when the IBC motion vector prediction mode is applied, samples of the video region are predicted from other samples in a video picture comprising the video region,
wherein, when the IBC motion vector prediction mode is applied and the merge mode is not applied, a vector of the video region is derived based on a motion vector predictor and a motion vector difference,
wherein the motion vector predictor is determined based on the motion vector predictor index of list 0,
wherein, when the maximum number of IBC candidates is equal to zero, the IBC motion vector prediction mode is disabled, and
wherein, when the IBC motion vector prediction mode is enabled for a slice comprising the video region, the maximum number of IBC candidates is greater than zero.

2. The method of claim 1, wherein at least one of a precision of the motion vector predictor, motion vector differences, or a precision of the motion vector difference of the IBC motion vector prediction mode is conditionally included in the bitstream when the IBC motion vector prediction mode is applied and the merge mode is not applied.

3. The method of claim 1,
wherein, based on the maximum number of the IBC candidates being larger than to K, the bitstream includes the at least one syntax element,
wherein, based on the maximum number of the IBC candidates being smaller than or equal to K, the bitstream excludes the at least one syntax element, and
wherein K is an integer.

4. The method of claim 3, wherein, when the motion vector predictor index of list 0 comprised in the at least one syntax element is excluded, the motion vector predictor index of list 0 is inferred to be zero.

5. The method of claim 3, wherein K=1.

6. The method of claim 1, wherein the maximum number of IBC candidates is indicated in the bitstream.

7. The method of claim 1, wherein the maximum number of the IBC candidates is derived to be (L—an indication signaled in the bitstream), wherein L is a pre-defined value.

8. The method of claim 7, wherein L=6.

9. The method of claim 1, wherein the maximum number of IBC candidates is decoupled from a maximum number of regular merge candidates of a block.

10. The method of claim 1, wherein the maximum number of IBC candidates is a maximum number of IBC merge candidates (denoted by maxIBCMrgNum).

11. The method of claim 1, wherein the conversion comprises decoding the video region from the bitstream.

12. The method of claim 1, wherein the conversion comprises encoding the video region into the bitstream.

13. An apparatus for processing video data comprising a processor and a non-transitory memory with instructions thereon, wherein the instructions upon execution by the processor, cause the processor to:
perform a conversion between a video region of a video and a bitstream of the video,
wherein whether a merge mode is applied is determined,
wherein whether an intra block copy (IBC) motion vector prediction mode is applied is determined,
wherein, when the IBC motion vector prediction mode is applied and the merge mode is not applied, whether to include at least one syntax element for the IBC motion vector prediction mode in the bitstream is based on a maximum number of IBC candidates used during the conversion of the video region,
wherein the at least one syntax element includes a motion vector predictor index of list 0,
wherein list 0 is a reference picture list of the video region with a reference picture list index of 0,
wherein, when the IBC motion vector prediction mode is applied, samples of the video region are predicted from other samples in a video picture comprising the video region,
wherein, when the IBC motion vector prediction mode is applied and the merge mode is not applied, a vector of the video region is derived based on a motion vector predictor and a motion vector difference,
wherein the motion vector predictor is determined based on the motion vector predictor index of list 0,
wherein, when the maximum number of IBC candidates is equal to zero, the IBC motion vector prediction mode is disabled, and
wherein, when the IBC motion vector prediction mode is enabled for a slice comprising the video region, the maximum number of IBC candidates is greater than zero.

14. The apparatus of claim 13,
wherein, based on the maximum number of the IBC candidates being larger than to K, the bitstream includes the at least one syntax element,
wherein, based on the maximum number of the IBC candidates being smaller than or equal to K, the bitstream excludes the at least one syntax element, and
wherein K is an integer.

15. A non-transitory computer-readable storage medium storing instructions that cause a processor to:
perform a conversion between a video region of a video and a bitstream of the video,
wherein whether a merge mode is applied is determined,
wherein whether an intra block copy (IBC) motion vector prediction mode is applied is determined,
wherein, when the IBC motion vector prediction mode is applied and the merge more is not applied, whether to include at least one syntax element for the IBC motion vector prediction mode in the bitstream is based on a maximum number of IBC candidates used during the conversion of the video region,
wherein the at least one syntax element includes a motion vector predictor index of list 0,
wherein list 0 is a reference picture list of the video region with a reference picture list index of 0,
wherein, when the IBC motion vector prediction mode is applied, samples of the video region are predicted from other samples in a video picture comprising the video region,
wherein, when the IBC motion vector prediction mode is applied and the merge mode is not applied, a vector of the video region is derived based on a motion vector predictor and a motion vector difference,
wherein the motion vector predictor is determined based on the motion vector predictor index of list 0,
wherein, when the maximum number of IBC candidates is equal to zero, the IBC motion vector prediction mode is disabled, and
wherein, when the IBC motion vector prediction mode is enabled for a slice comprising the video region, the maximum number of IBC candidates is greater than zero.

16. The non-transitory computer-readable storage medium of claim 15,
wherein, based on the maximum number of the IBC candidates being larger than to K, the bitstream includes the at least one syntax element,
wherein, based on the maximum number of the IBC candidates being smaller than or equal to K, the bitstream excludes the at least one syntax element, and
wherein K is an integer.

17. A non-transitory computer-readable recording medium storing a bitstream of a video which is generated by a method performed by a video processing apparatus, wherein the method comprises:
generating the bitstream based on a video region of the video,
wherein whether a merge mode is applied is determined,
wherein whether an intra block copy (IBC) motion vector prediction mode is applied is determined,
wherein, when the IBC motion vector prediction mode is applied and the merge mode is not applied, whether to include at least one syntax element for the IBC motion vector prediction mode in the bitstream is based on a maximum number of IBC candidates used during the conversion of the video region,
wherein the at least one syntax element includes a motion vector predictor index of list 0,
wherein list 0 is a reference picture list of the video region with a reference picture list index of 0,
wherein, when the IBC motion vector prediction mode is applied, samples of the video region are predicted from other samples in a video picture comprising the video region,
wherein, when the IBC motion vector prediction mode is applied and the merge mode is not applied, a vector of the video region is derived based on a motion vector predictor and a motion vector difference,
wherein the motion vector predictor is determined based on the motion vector predictor index of list 0,
wherein, when the maximum number of IBC candidates is equal to zero, the IBC motion vector prediction mode is disabled, and wherein, when the IBC motion vector prediction mode is enabled for a slice comprising the video region, the maximum number of IBC candidates is greater than zero.

18. The apparatus of claim 14, wherein a motion vector predictor index comprised in the at least one syntax element is excluded, and wherein the motion vector predictor index is inferred to be zero.

19. The non-transitory computer-readable recording medium of claim 17,
wherein, based on the maximum number of the IBC candidates being larger than to K, the bitstream includes the at least one syntax element,
wherein, based on the maximum number of the IBC candidates being smaller than or equal to K, the bitstream excludes the at least one syntax element, and
wherein K is an integer.

* * * * *

UNITED STATES PATENT AND TRADEMARK OFFICE
CERTIFICATE OF CORRECTION

PATENT NO. : 11,616,973 B2
APPLICATION NO. : 17/506539
DATED : March 28, 2023
INVENTOR(S) : Li Zhang et al.

It is certified that error appears in the above-identified patent and that said Letters Patent is hereby corrected as shown below:

On the Title Page

Item (30) Foreign Application Priority Data, delete:
"May 25, 2020 (WO) ............ PCT/CN2019088454"
And insert:
-- May 25, 2019 (WO) ............ PCT/CN2019/088454 --, therefor.

Signed and Sealed this
Fourteenth Day of May, 2024

Katherine Kelly Vidal
*Director of the United States Patent and Trademark Office*